(12) United States Patent
Lawler et al.

(10) Patent No.: US 8,720,317 B2
(45) Date of Patent: May 13, 2014

(54) METHODS AND SYSTEMS FOR MANAGING A CLEARANCE GAP IN A PISTON ENGINE

(75) Inventors: John Lawler, San Francisco, CA (US); Matt Svrcek, Redwood City, CA (US)

(73) Assignee: EtaGen, Inc., Menlo Park, CA (US)

( * ) Notice: Subject to any disclaimer, the term of this patent is extended or adjusted under 35 U.S.C. 154(b) by 0 days.

(21) Appl. No.: 13/340,534

(22) Filed: Dec. 29, 2011

(65) Prior Publication Data

US 2013/0167714 A1 Jul. 4, 2013

(51) Int. Cl.
*F01B 23/10* (2006.01)

(52) U.S. Cl.
USPC ............. 92/162 R; 92/162 P; 123/46 R

(58) Field of Classification Search
USPC .......... 92/86.5, 153, 162 R, 162 P; 123/46 R, 123/193.4
See application file for complete search history.

(56) References Cited

U.S. PATENT DOCUMENTS

| | | | |
|---|---|---|---|
| 1,679,964 A | 8/1928 | Edwards | |
| 1,867,718 A | 1/1932 | Towell | |
| 2,413,751 A | 1/1947 | Wolcott | |
| 2,449,297 A | 9/1948 | Hoffer | |
| 2,567,042 A | 9/1951 | Wemp et al. | |
| 2,624,328 A | 1/1953 | Grinham et al. | |
| 2,809,873 A * | 10/1957 | Cavileer | 92/153 |
| 2,814,551 A | 11/1957 | Broeze et al. | |
| 2,907,304 A * | 10/1959 | Macks | 91/6 |
| 3,001,609 A * | 9/1961 | Macks | 184/18 |
| 3,035,879 A * | 5/1962 | Hanny et al. | 92/112 |
| 3,170,406 A | 2/1965 | Robertson et al. | |
| 3,190,271 A | 6/1965 | Gudmundsen | |
| 3,225,617 A | 12/1965 | Young et al. | |
| 3,548,721 A * | 12/1970 | Eisennegger | 92/153 |
| 3,588,291 A | 6/1971 | Curwen | |
| 3,653,303 A | 4/1972 | Zurcher | |
| 3,663,071 A * | 5/1972 | Kates | 384/12 |
| 3,749,066 A | 7/1973 | Cseh | |
| 3,777,621 A | 12/1973 | Blok et al. | |

(Continued)

FOREIGN PATENT DOCUMENTS

| | | |
|---|---|---|
| CN | 101363353 A | 2/2009 |
| DE | 202005018178 U1 | 2/2006 |

(Continued)

OTHER PUBLICATIONS

G. Belforte, A. Romiti, T. Raparelli, P. Di Torino, "Study and Realization of High Efficiency Sealless Cylinder," International Fluid Power Exposition, Mar. 24-26, 1992, 10 pages, National Fluid Power Association.

(Continued)

*Primary Examiner* — Thomas E Lazo
(74) *Attorney, Agent, or Firm* — Shvarts & Leiz LLP

(57) ABSTRACT

A piston engine may include a non-contact bearing between a piston assembly and a cylinder. The piston may be configured to translate in a bore of the cylinder, and a non-contact bearing may be included in a clearance gap between the piston assembly and the bore. A bearing fluid may be supplied to the clearance gap via the piston assembly and/or cylinder to create the non-contact bearing. A bearing element may be used to direct or otherwise manage the flow of bearing fluid in the clearance gap. The bearing element may include one or more holes, porous portions, and/or passages to direct the bearing fluid to the clearance gap.

21 Claims, 16 Drawing Sheets

(56) References Cited

U.S. PATENT DOCUMENTS

| | | | |
|---|---|---|---|
| 3,777,722 A * | 12/1973 | Lenger | 123/46 R |
| 3,779,672 A | 12/1973 | Schroeder | |
| 3,859,971 A | 1/1975 | Rauen | |
| 3,956,895 A | 5/1976 | Noble et al. | |
| 3,974,745 A | 8/1976 | Godmaire | |
| 4,013,047 A | 3/1977 | Harned | |
| 4,048,975 A | 9/1977 | Urquhart | |
| 4,069,794 A | 1/1978 | Jordan | |
| 4,111,104 A | 9/1978 | Davison, Jr. | |
| 4,135,723 A | 1/1979 | Urquhart | |
| 4,137,015 A | 1/1979 | Grossman | |
| 4,154,200 A | 5/1979 | Jarret et al. | |
| 4,246,833 A | 1/1981 | Burklund | |
| 4,304,410 A | 12/1981 | Erickson et al. | |
| 4,308,720 A | 1/1982 | Brandstadter | |
| 4,455,974 A * | 6/1984 | Shapiro et al. | 123/47 R |
| 4,470,375 A | 9/1984 | Showalter | |
| 4,480,599 A | 11/1984 | Allais | |
| 4,485,779 A | 12/1984 | Spurk | |
| 4,493,292 A | 1/1985 | Showalter | |
| 4,522,163 A | 6/1985 | Hooper | |
| 4,545,738 A | 10/1985 | Young | |
| 4,627,795 A | 12/1986 | Schmitz-Montz | |
| 4,644,851 A | 2/1987 | Young | |
| 4,719,846 A | 1/1988 | Langstroth | |
| 4,776,260 A | 10/1988 | Vincze | |
| 4,776,261 A | 10/1988 | Larson | |
| 4,799,421 A * | 1/1989 | Bremer et al. | 92/162 R |
| 4,846,051 A * | 7/1989 | Wade et al. | 92/153 |
| 4,854,156 A | 8/1989 | Hoeffel et al. | |
| 4,876,991 A | 10/1989 | Galitello, Jr. | |
| 4,889,039 A * | 12/1989 | Miller | 92/140 |
| 4,924,956 A | 5/1990 | Deng et al. | |
| 4,932,313 A | 6/1990 | Gutknecht | |
| 5,030,182 A | 7/1991 | Frost | |
| 5,115,768 A | 5/1992 | Peschka et al. | |
| 5,140,905 A * | 8/1992 | Dhar | 92/82 |
| 5,174,728 A | 12/1992 | Kimura et al. | |
| 5,313,875 A * | 5/1994 | Kadlicko | 92/157 |
| 5,454,351 A | 10/1995 | Cao et al. | |
| 5,701,797 A | 12/1997 | Mohn | |
| 5,775,273 A | 7/1998 | Beale | |
| 5,832,880 A | 11/1998 | Dickey | |
| 5,967,017 A | 10/1999 | Hooke et al. | |
| 6,170,442 B1 | 1/2001 | Beale | |
| 6,199,519 B1 | 3/2001 | Van Blarigan | |
| 6,276,313 B1 | 8/2001 | Yang et al. | |
| 6,293,184 B1 * | 9/2001 | Unger | 92/153 |
| 6,314,924 B1 | 11/2001 | Berlinger | |
| 6,349,681 B1 | 2/2002 | Li | |
| 6,374,924 B1 | 4/2002 | Hanton et al. | |
| 6,378,875 B1 | 4/2002 | Feistel | |
| 6,415,745 B1 | 7/2002 | Hellen et al. | |
| 6,443,104 B1 | 9/2002 | Simescu et al. | |
| 6,532,916 B2 | 3/2003 | Kerrebrock | |
| 6,541,875 B1 | 4/2003 | Berlinger et al. | |
| 6,863,507 B1 | 3/2005 | Schaeffer et al. | |
| 6,901,845 B2 * | 6/2005 | Kiikka | 92/153 |
| 6,945,202 B2 | 9/2005 | Kaneko et al. | |
| 7,052,182 B2 | 5/2006 | Shinohara et al. | |
| 7,082,909 B2 | 8/2006 | Gräf et al. | |
| 7,104,227 B2 | 9/2006 | Roberts | |
| 7,258,085 B2 | 8/2007 | Niiyama et al. | |
| 7,387,062 B2 | 6/2008 | Chen | |
| 7,438,027 B1 | 10/2008 | Hinderks | |
| 7,469,664 B2 | 12/2008 | Hofbauer et al. | |
| 7,470,065 B2 | 12/2008 | Stadlmayr et al. | |
| 7,600,464 B2 * | 10/2009 | Cale et al. | 92/110 |
| 7,622,814 B2 | 11/2009 | Hyde et al. | |
| 7,624,574 B2 | 12/2009 | Sawada et al. | |
| 7,640,910 B2 | 1/2010 | Lemke et al. | |
| 7,690,199 B2 | 4/2010 | Wood | |
| 7,690,900 B2 | 4/2010 | Sieber | |
| 7,784,436 B2 | 8/2010 | Lemke et al. | |
| 7,845,317 B2 | 12/2010 | Max et al. | |
| 7,861,679 B2 | 1/2011 | Lemke et al. | |
| 8,040,011 B2 | 10/2011 | Mueller et al. | |
| 8,402,931 B2 | 3/2013 | Simpson et al. | |
| 8,413,617 B2 | 4/2013 | Simpson et al. | |
| 8,607,560 B2 | 12/2013 | Fiedler | |
| 2005/0284427 A1 | 12/2005 | Barth | |
| 2006/0157003 A1 | 7/2006 | Lemke et al. | |
| 2007/0215093 A1 | 9/2007 | Lemke et al. | |
| 2007/0251487 A1 | 11/2007 | Heidrich et al. | |
| 2008/0078288 A1 | 4/2008 | Heidrich et al. | |
| 2008/0271711 A1 | 11/2008 | Cheeseman | |
| 2009/0031991 A1 | 2/2009 | Lindegarde | |
| 2009/0125211 A1 | 5/2009 | Akihisa et al. | |
| 2009/0199821 A1 | 8/2009 | Marchetti | |
| 2009/0277516 A1 | 11/2009 | Winkler et al. | |
| 2009/0308345 A1 | 12/2009 | Van den Brink | |
| 2010/0109343 A1 | 5/2010 | Lemke et al. | |
| 2010/0162998 A1 | 7/2010 | Graef | |
| 2010/0218496 A1 | 9/2010 | Miles et al. | |
| 2011/0174271 A1 | 7/2011 | Wood | |
| 2011/0219763 A1 | 9/2011 | McBride et al. | |
| 2012/0125288 A1 | 5/2012 | Simpson et al. | |
| 2012/0125291 A1 | 5/2012 | Simpson et al. | |
| 2012/0126543 A1 | 5/2012 | Simpson et al. | |
| 2012/0204836 A1 | 8/2012 | Roelle et al. | |
| 2012/0227699 A1 * | 9/2012 | Perry et al. | 123/193.4 |

FOREIGN PATENT DOCUMENTS

| | | |
|---|---|---|
| DE | 102007056527 | 5/2009 |
| EP | 0330326 A2 | 8/1989 |
| EP | 2357348 A1 | 8/2011 |
| GB | 1125524 A | 8/1968 |
| JP | S59 101565 A | 6/1984 |
| JP | 2002-322946 | 11/2002 |
| JP | 2003-343202 | 12/2003 |
| JP | 2008-223657 A | 9/2008 |
| WO | WO 02/44593 A1 | 6/2002 |
| WO | WO 2010118738 | 10/2010 |

OTHER PUBLICATIONS

G. Belforte, T. Raparelli, L. Mazza, A. Trivella, "Analysis, Design, and Comparison of Different Types of Pistons for Sealless Pneumatic Cylinders and Valves," Tribology Transactions, 2005, vol. 48, Issue 3, pp. 377-388, Copyright Society of Tribologists and Lubrication Engineers.

International Search Report and Written Opinion of the International Searching Authority for Application No. PCT/US2011/061145, mailed on Mar. 28, 2012.

International Search Report and Written Opinion of the International Searching Authority for Application No. PCT/US2011/066214, mailed on Apr. 18, 2012.

International Search Report and Written Opinion of the International Searching Authority for Application No. PCT/US2012/071523, mailed on Jun. 4, 2013.

International Search Report and Written Opinion of the International Searching Authority for Application No. PCT/US2012/071524, mailed on Jun. 4, 2013.

International Search Report and Written Opinion of the International Searching Authority for Application No. PCT/US2012/071525, mailed on Jun. 4, 2013.

International Search Report and Written Opinion of the International Searching Authority for Application No. PCT/US2012/071526, mailed on Jun. 4, 2013.

Kim, Seon-Young, "Specific Power Estimations for Free-Piston Stirling Engines," American Institute of Aeronautics & Astronautics, Jun. 2006 pp. 1-8.

Mikalsen, R., "A Review of Free-Piston Engine History and Applications," Applied Thermal Engineering 27 (2007) pp. 2339-2352.

Schreiber, Jeffrey G., "Developmental Considerations on the Free-Piston Stirling Power Convertor for Use in Space," NASA/TM 2007-214805, 39 pages.

(56) References Cited

OTHER PUBLICATIONS

Van Blarigan, Peter, "Advanced Internal Combustion Engine Research," DOE Hydrogen Program Review NREL/CP-570-28890 (2000), pp. 1-19.

Van Blarigan, Peter, "Free-Piston Engine," Transportation Energy Center, FY 2009 DOE Vehicle Technologies Program Annual Merit Review, May 19, 2009, pp. 1-17.

* cited by examiner

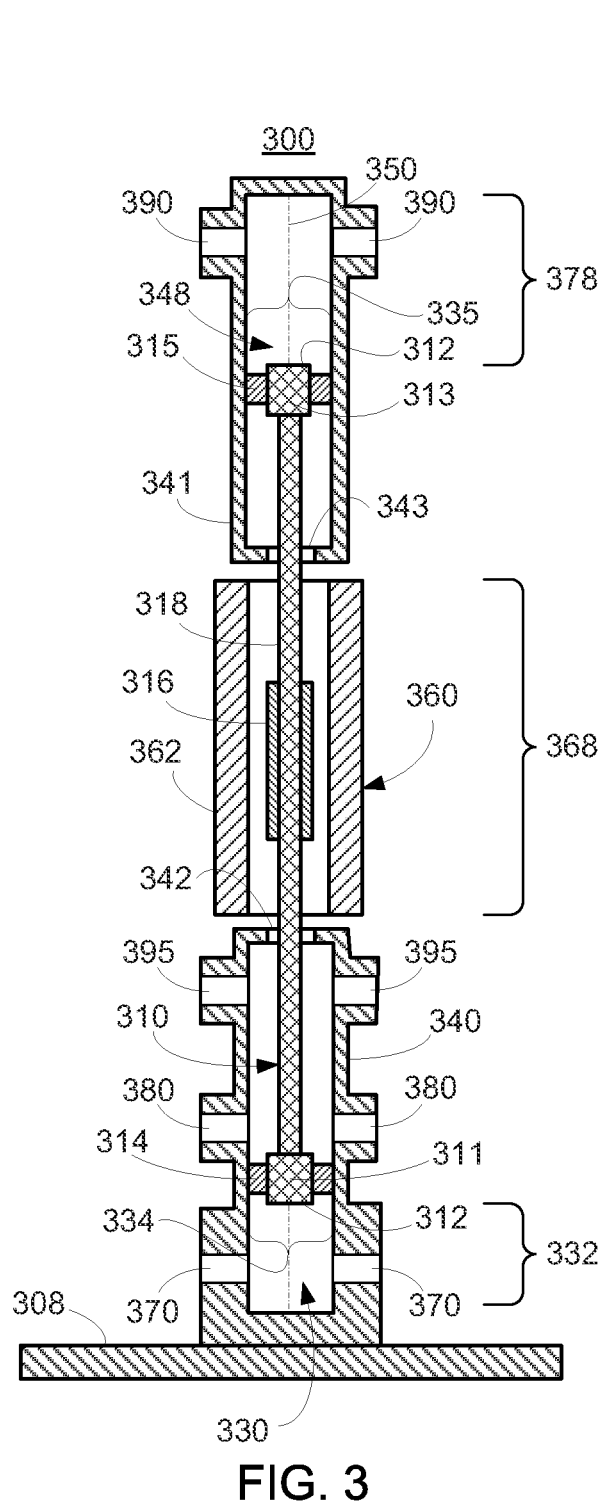
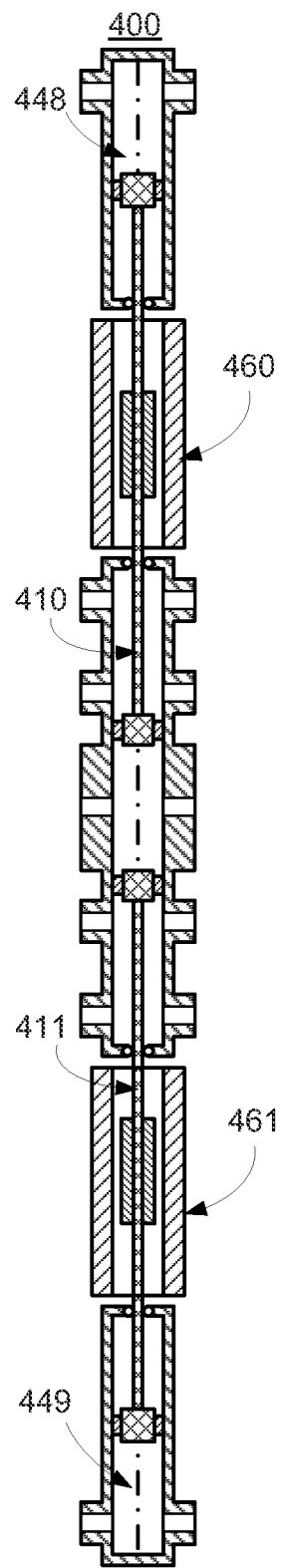
FIG. 3
FIG. 4

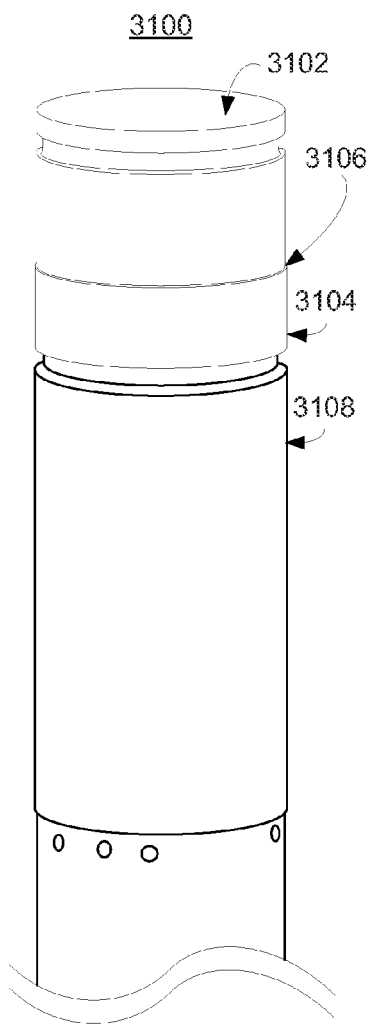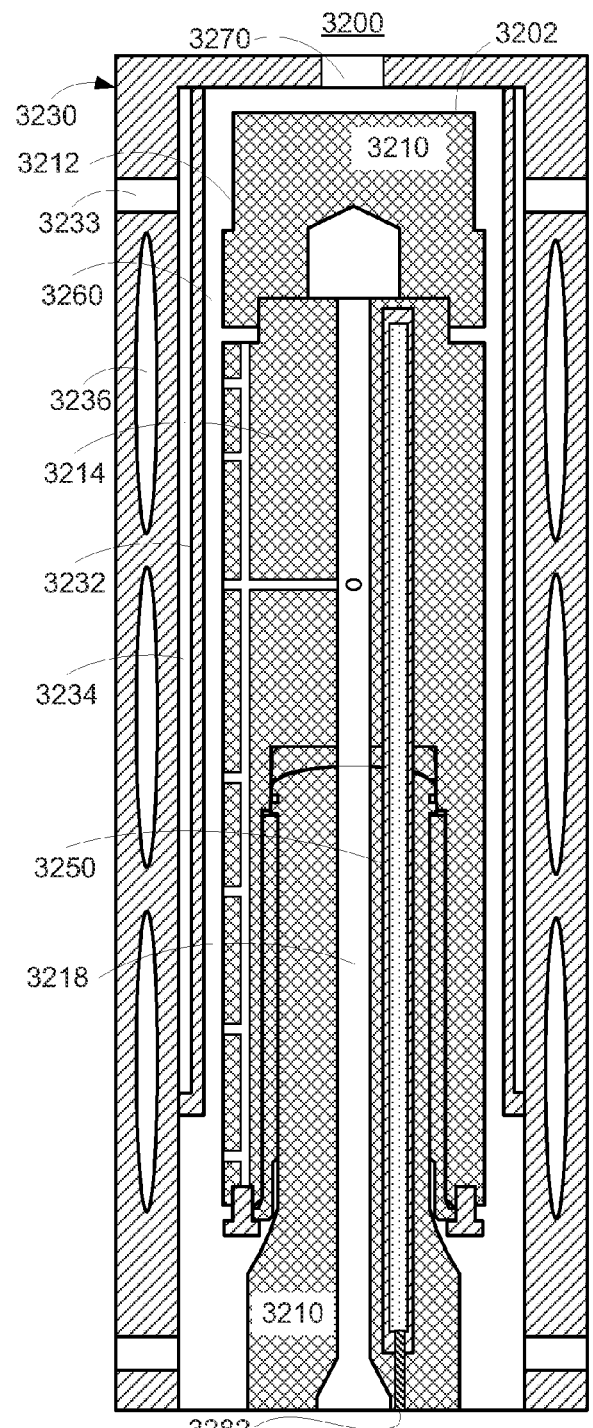
FIG. 31
FIG. 32

METHODS AND SYSTEMS FOR MANAGING A CLEARANCE GAP IN A PISTON ENGINE

The present disclosure relates to controlling aspects of a piston engine, and more particularly relates to system and methods for managing the clearance gap between a piston and cylinder of the piston engine.

BACKGROUND

As an engine's compression ratio is increased, while maintaining a particular bore-to-stroke ratio, the surface to volume ratio at top dead center (TDC) increases, the temperature increases, and the pressure increases. This has three major consequences: 1) heat transfer from the combustion chamber increases, 2) combustion phasing becomes difficult, and 3) friction and mechanical losses increase. Heat transfer increases because the thermal boundary layer becomes a larger fraction of the overall volume as the aspect ratio (i.e., the ratio of the bore diameter to the length of the combustion chamber) at TDC gets smaller. Both combustion phasing and achieving complete combustion present challenges because of the small volume realized at TDC. Increased combustion chamber pressure directly translates to increased forces acting on components of the engine. These large forces may overload both the mechanical linkages within the engine (e.g., piston pin, piston rod, crank shaft) and the pressure-energized rings, thus causing increased friction, wear, and/or failure.

A primary challenge associated with linear piston engines is efficiently converting the kinetic energy of a piston to mechanical work and/or electrical energy. The space between the piston and the cylinder wall, referred to herein as a "clearance gap," is critical in maintaining piston alignment, preventing piston-wall contact and associated friction losses, and controlling gas leakage past the piston (e.g., blow-by). The clearance gap may be affected by imbalanced forces acting on the piston, thermally induced expansion or contraction (e.g., solid deformation), changing engine conditions, or other relevant factors. Management of the clearance gap, piston temperature, cylinder temperature, or combinations thereof, may be desired in some applications.

SUMMARY

In some embodiments, a piston engine may include a piston and cylinder assembly, which may include a fluid bearing in the clearance gap between a bore of a cylinder and a piston assembly. The piston assembly may be capable of translating axially within the bore, and a piston face may contact a combustion section of the cylinder, facing one end of the cylinder. At least one bearing element may provide a flow of a bearing fluid into the clearance gap between the bore and the piston assembly to form the fluid bearing. In some embodiments, the bearing element may be a part of the piston assembly, providing a flow of bearing fluid radially outward, and the piston assembly may include fluid passages to direct the bearing fluid. In some embodiments, the bearing element may be a part of the cylinder, providing a flow of bearing fluid radially inward, and the cylinder may include fluid passages to direct the bearing fluid. A bearing element may include holes, an effusive surface, any other suitable fluid outlet, or any combination thereof to provide the bearing fluid to the clearance gap.

In some embodiments, a piston engine may include a piston and cylinder assembly including a piston having a self-centering feature, and a cylinder. The piston may be configured to translate axially within a bore of the cylinder. In some embodiments, the piston may be a part of a piston assembly that translates axially within the bore of the cylinder. The cylinder may include a combustion section capable of containing combustion products. Blow-by gas from the combustion section may flow axially away from the combustion section, past a piston face, through a clearance gap between the piston and the cylinder. The self-centering feature may provide a self-centering force on the piston using the flow of blow-by gas. The self-centering feature may be a step, one or more slotted pockets, a tapered portion, any other suitable feature, or any combination thereof.

In some embodiments, a piston engine may include a piston assembly having one or more heat pipes. The piston assembly may be configured to translate axially within a bore of the cylinder. The cylinder may include a combustion section capable of containing combustion products, and accordingly a piston face of the piston assembly may experience elevated temperatures. In some embodiments, the heat pipe may be in thermal contact with the piston face, and may be capable of transferring heat from the piston face to a heat receptacle. A first portion of the heat pipe may receive heat from the piston face, and a second portion of the heat pipe may transfer the heat to a heat receptacle. The heat pipe may include a fluid such as, for example, water, ethanol, ammonia, or sodium, which may undergo a vapor-liquid phase transition.

In some embodiments, a piston engine may include a cylinder liner configured to be positioned coaxially within a cylinder of a piston engine. The cylinder liner may include an inner face that is capable of forming a clearance gap with a piston assembly that is capable of translating axially within the cylinder liner. The cylinder liner may also include an outer face that interfaces with the cylinder of the piston engine. The interface between the outer face and the cylinder may include a fluid passage that may act as a conduit for a pressure controlled fluid. The cylinder liner may be configured to radially contract or expand based at least in part on the pressure controlled fluid, and thus the clearance gap may be adjusted.

In some embodiments, a piston engine may include one or more fluid passages configured to provide localized, selective, fast-response, or otherwise controlled heating or cooling to a cylinder. A flow rate, temperature, pressure, or combination thereof of a fluid supplied to the fluid passages may be adjusted by a control system to control a temperature of the piston engine. In some embodiments, a cylinder may include one or more localized heating sources such as, for example, one or more electric heaters, which may be controlled by a control system to provide localized heating.

In some embodiments, a clearance gap between a coaxial piston assembly and a cylinder of a piston engine may be controlled. At least one indicator such as for example, temperature, pressure, a work interaction, and/or other suitable indicators of the clearance gap may be detected using one or more sensors. A control response may be determined by processing equipment based at least in part on the indicator. The processing equipment may use a control interface to provide a control signal to at least one auxiliary system of the piston engine based at least in part on the control response. At least one auxiliary system may adjust the clearance gap based at least in part on the control signal.

BRIEF DESCRIPTION OF THE FIGURES

The above and other features of the present disclosure, its nature and various advantages will be more apparent upon consideration of the following detailed description, taken in conjunction with the accompanying drawings in which:

FIG. 3 shows a cross-section view of an illustrative piston engine with a piston assembly having two pistons, a separate gas spring, and an integrated LEM, in accordance with some embodiments of the present disclosure;

FIG. 4 shows a cross-section view of an illustrative piston engine with two piston assemblies, separated gas springs, and two integrated LEMS, in accordance with some embodiments of the present disclosure;

FIG. 31 shows a perspective view of a portion of an illustrative piston assembly having bearing elements and a self-centering feature, in accordance with some embodiments of the present disclosure;

FIG. 32 shows a cross-section view of an illustrative piston engine with a piston assembly having a bearing element, a heat pipe, and a self-centering feature, and a cylinder having a deformable cylinder liner and coolant passages, in accordance with some embodiments of the present disclosure;

DETAILED DESCRIPTION OF THE FIGURES

The present disclosure is directed towards managing the clearance gap and/or other properties of a piston engine. While discussed in the context of free piston engines, the techniques and arrangements disclosed herein can be applied to non-free piston engines, or other suitable mechanical systems. Herein, the term "piston engine" shall refer to both free and non-free piston engines.

A piston engine, operating using any suitable thermodynamic cycle, may include a piston and cylinder assembly to realize displacement work. The piston and cylinder may be separated by a relatively small clearance gap, and the piston translates axially within a bore of the cylinder. In some embodiments, the piston may be included as part of a "piston assembly," which may also include one or more piston seals (e.g., piston rings), bearing elements, frames, piston rods, translators and/or other components, which may be capable of moving in concert as a substantially rigid assembly, at least partially within the bore. The clearance gap may be constant or varied along the radial perimeter of the piston assembly, or component thereof (e.g., the clearance may be described by a thickness value, a profile or field of values, and/or a symmetry metric). The cylinder may include a combustion section, into which oxidizer (e.g., air, vitiated air, oxygen) and fuel (e.g., a gaseous or liquid hydrocarbon fuel) may be supplied separately, or as a pre-mixed mixture, for combustion. Expansion of the hot combustion products causes displacement of the piston. Work may be extracted from the piston's motion using a mechanical linkage (e.g., using a piston rod and crankshaft assembly), an electromagnetic interaction (e.g., using a linear electromagnetic machine (LEM) having a translator and stator as described in the present disclosure), a gas linkage (e.g., using two pistons interacting via an intermediate gas volume), any other suitable work extraction technique, or any combination thereof. Compression of the air and/or fuel by the piston-cylinder assembly may also be achieved using the motion of the piston. In some embodiments, compression work may be provided by a gas driver, a LEM, or both.

FIGS. 1-4 show illustrative piston engines that may benefit from the teachings of the present disclosure. It will be understood that the teachings of the present disclosure may be applied to any other suitable piston engines in addition to the ones illustrated in the figures and described herein. It will also be understood that although not illustrated in FIGS. 1-4, a piston engine may include one or more subsystems such as, for example, cooling subsystems, air delivery systems, fuel delivery systems, ignition subsystems, exhaust systems, electronic control systems, and/or other suitable subsystems, and that the phrase "piston engine" may refer to a suitable collection of components and subsystems.

Figure 1:
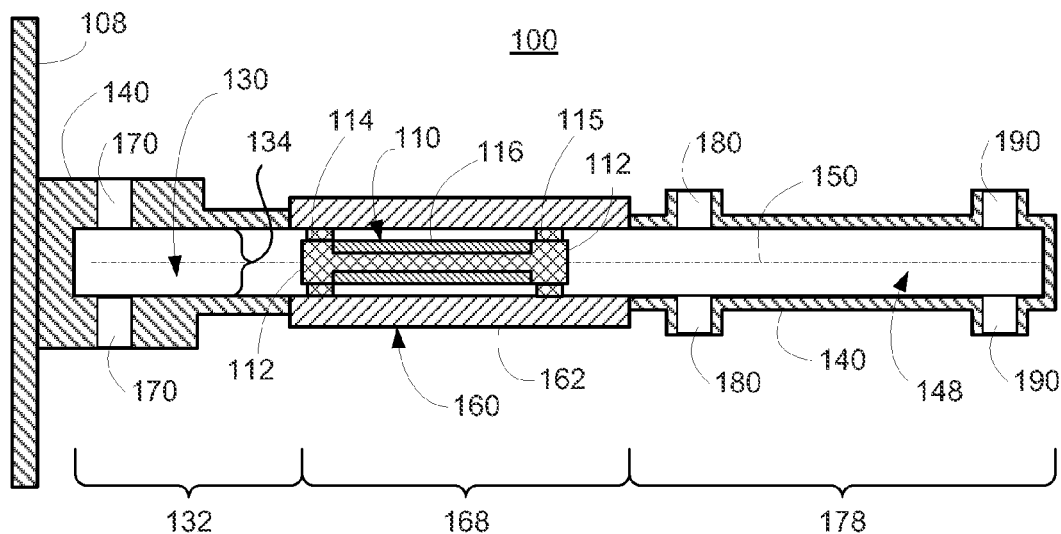
FIG. 1 shows a cross-section view of an illustrative piston engine with a piston assembly, a gas spring, and an integrated linear electromagnetic machine (LEM) included as part of the cylinder, in accordance with some embodiments of the present disclosure.

FIG. 1 shows a cross-section view of an illustrative piston engine 100 with a piston assembly 110, gas spring 148, and an integrated linear electromagnetic machine (LEM) 160, in accordance with some embodiments of the present disclosure. Piston engine 100 includes a cylinder 140 having a bore 134 and a combustion section 130, as well as a piston assembly 110. In the illustrated embodiment, piston assembly 110 includes two piston faces 112, piston seals 114 and 115, and translator 116. Although not shown in FIG. 1, piston assembly 110 may include bearing elements, a piston rod, any other suitable components, or any combination thereof. In the illustrated embodiment, piston assembly 110 is located completely within bore 134 of cylinder 140, and is configured to translate substantially along axis 150. Cylinder 140, as shown in FIG. 1, includes exhaust/injector ports 170 (for removal of exhaust and/or injection of reactants), intake ports 180 (for intake of air and/or air/fuel mixtures), and driver gas ports 190 (for supply and/or removal of driver gas). Piston engine 100 may operate using a two-stroke cycle, a four-stroke cycle, any other suitable cycle, or any combination thereof. Impact plate 108 may be included in some embodiments to aid in impact resistance, for example, during combustion. Valves and/or other fluid components may, but need not, be used with any or all of ports 170, 180, and 190 to control inflows and outflows of fluids to and from piston engine 100.

Cylinder 140 may include portion 132 in which combustion, gas expansion, and exhaust may occur, portion 168 in which electromagnetic work interactions may occur, and portion 178 in which gas driving and gas springing may occur. Portions 132, 168, and 178 may depend on the configuration of cylinder 140, as well as the position of piston assembly 110 within bore 134 of cylinder 140. Stator 162, used to extract electromagnetic work from motion of translator 116, may be included as part of cylinder 140, as shown in FIG. 1.

During an expansion stroke of piston assembly 110 within cylinder 140, due to combustion of an oxidizer and fuel in combustion section 130, translator 116 may translate through stator 162. The motion of translator 116 relative to stator 162 may generate an electrical current, and corresponding electrical work. LEM 160 may include a permanent magnet machine, an induction machine, a switched reluctance machine, any other suitable electromagnetic machine, or any combination thereof. For example, translator 116 may include a permanent magnet, and stator 162 may include a wire coil which may conduct an induction current generated by the motion of translator 116.

Figure 2:
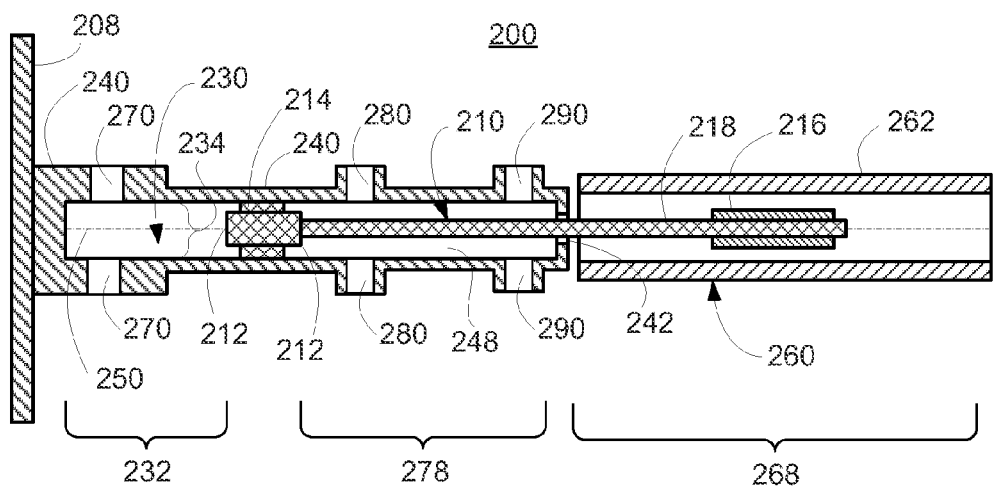
FIG. 2 shows a cross-section view of an illustrative piston engine with a piston assembly, a gas spring, and an integrated linear electromagnetic machine (LEM), in accordance with some embodiments of the present disclosure.

FIG. 2 shows a cross-section view of an illustrative piston engine 200 with a piston assembly 210, gas spring 248, and LEM 260, in accordance with some embodiments of the present disclosure. Piston engine 200 includes a cylinder 240 having a bore 234, piston assembly 210, and a combustion section 230. In the illustrated embodiment, piston assembly 210 includes piston faces 212, piston seal 214 (e.g., piston rings, sealing surfaces), translator 216, and piston rod 218. Although not shown in FIG. 2, piston assembly 210 may include bearing elements, any other suitable components, or any combination thereof. In the illustrated embodiment, piston assembly 210 is located partially within bore 234 of cylinder 240, and is configured to translate substantially along axis 250. Cylinder 240, as shown in FIG. 2, includes gas seal 242 (to reduce or prevent gas leakage while allowing relative piston motion), exhaust/injector ports 270 (for removal of exhaust and/or injection of reactants), intake ports 280 (for intake of air and/or air/fuel mixtures), and driver gas ports 290 (for supply and/or removal of driver gas). Piston engine 200 may operate using a two-stroke cycle, a four-stroke cycle, any other suitable cycle, or any combination thereof. Impact plate 208 may be included in some embodiments.

Cylinder 240 may include portion 232 in which combustion, gas expansion, and exhaust may occur, and portion 278 in which gas driving and gas springing may occur. Portion 268 may be included separate from cylinder 240, and may include LEM 260 for which electromagnetic work interactions may occur. Portions 232, 268, and 278 may depend on the configuration of cylinder 240, as well as the position of piston assembly 210 within bore 234 of cylinder 240. Stator 262, used to extract electromagnetic work from motion of translator 216, may be, but need not be, separate from cylinder 240, as shown in FIG. 2.

FIG. 3 shows a cross-section view of an illustrative piston engine 300 with a piston assembly 310 having two pistons 311 and 313, a separate gas spring 348, and LEM 360, in accordance with some embodiments of the present disclosure. Piston engine 300 includes cylinders 340 and 341 having bores 334 and 335, respectively, piston assembly 310, and a combustion section 330. In the illustrated embodiment, piston assembly 310 includes piston faces 312, translator 316, piston seals 314 and 315, and piston rod 318. Although not shown in FIG. 3, piston assembly 310 may include bearing elements, any other suitable components, or any combination thereof. In the illustrated embodiment, piston assembly 310 is located partially within bore 334 of cylinder 340, and partially within bore 335 of cylinder 341, and is configured to translate substantially along axis 350. Cylinder 340, as shown in FIG. 3, includes gas seal 342 (to reduce or prevent gas leakage while allowing relative piston motion), exhaust/injector ports 370 (for removal of exhaust and/or injection of reactants), intake ports 380 (for intake of air and/or air/fuel mixtures), and gas ports 395 (for removal of blow-by, or supply of air). Cylinder 341, as shown in FIG. 3, includes gas seal 343 (to reduce or prevent gas leakage while allowing relative piston motion), driver gas ports 390 (for supply and/or removal of driver gas). Piston engine 300 may operate using a two-stroke cycle, a four-stroke cycle, any other suitable cycle, or any combination thereof. Impact plate 308 may be included in some embodiments.

Cylinder 340 may include portion 332 in which combustion, gas expansion, and exhaust may occur. Cylinder 341 may include portion 378 in which gas driving and gas springing may occur. Portion 368 may be included between cylinders 340 and 341, and may include a LEM for which electromagnetic work interactions may occur. Portions 332, 368, and 378 may depend on the configuration of cylinders 340 and 341, as well as the position of piston assembly 310 within bores 334 and 335 of respective cylinders 340 and 341. Stator 362, used to extract electromagnetic work from motion of translator 316, may be, but need not be, separate from cylinders 340 and 341, as shown in FIG. 3.

FIG. 4 shows a cross-section view of an illustrative piston engine 400 with two piston assemblies 410 and 411, separated gas springs 448 and 449, and two LEMs 460 and 461, in accordance with some embodiments of the present disclosure. Piston engine 400, as shown, is substantially equivalent to two piston engines 300, symmetric about exhaust/injector ports 370, having a single combustion chamber. It will be understood that other two-piston arrangements may be achieved in accordance with the present disclosure, which may be but need not be symmetric, and that piston engine 400 is an illustrative example.

Further details regarding piston engines such as piston engine 100, 200, 300, and 400, and their operation and characteristics, are included in Simpson et al. U.S. patent application Ser. No. 12/953,270, Simpson et al. U.S. patent application Ser. No. 12/953,277, Simpson et al. U.S. patent application Ser. No. 13/102,916, and Roelle et al. U.S. patent application Ser. No. 13/028,053, all of which are hereby incorporated by reference herein their entireties.

Self-Centering Piston

In some embodiments, a piston may include one or more features which provide self-centering relative to a cylinder of a piston engine.

Figure 5:
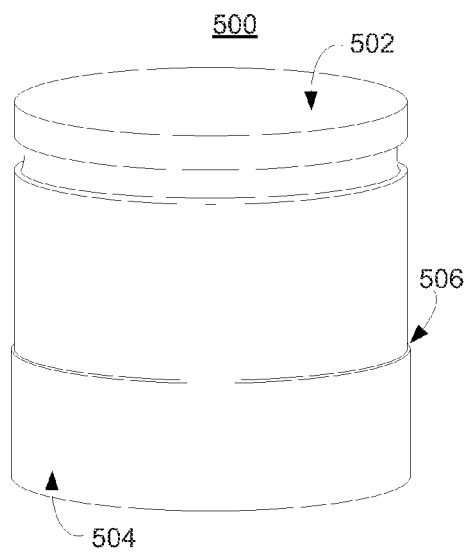
FIG. 5 shows a perspective view of a portion of an illustrative piston assembly with a self-centering feature, in accordance with some embodiments of the present disclosure.

FIG. 5 shows a perspective view of a portion of an illustrative piston assembly 500 with a self-centering feature 506, in accordance with some embodiments of the present disclosure. Piston assembly 500 may include piston face 502, element 504, self-centering feature 506, any other suitable components (not shown), or any combination thereof. In some embodiments, self-centering feature 506 may be a part of element 504. For example, element 504 may be a bearing element (e.g., an aerostatic bearing), and self-centering feature 506 may be a machined step or other suitable feature in the bearing element. In some embodiments, self-centering feature 506 may be a part of piston face 502. For example, self-centering feature 506 may be a step, one or more slotted pockets, a tapered portion, or other feature included in piston assembly 500. In some embodiments, a piston assembly may include one or more features, components, or both, that aid in centering the piston assembly. For example, a piston assembly may include a self-centering feature and a feature that may aid in equalizing the pressure on one or more lateral surfaces of a piston assembly, which may aid in centering of the piston. Although not shown in FIG. 5, piston assembly 500 may optionally include a piston rod, a translator, a piston ring, a fluid bearing, any other suitable components, or any combination thereof.

Figure 6:
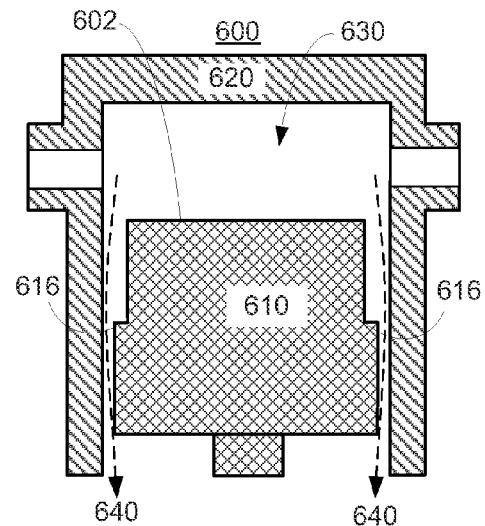
FIG. 6 shows a cross-section view of an illustrative piston assembly and cylinder, with blow-by from a combustion section, in accordance with some embodiments of the present disclosure.

FIG. 6 shows a cross-section view of an illustrative arrangement 600 of a piston assembly 610 and a cylinder 620, with blow-by (shown by arrows 640) from a combustion section 630, in accordance with some embodiments of the present disclosure. In some embodiments, piston face 602 may contact combustion section 630 (shown illustratively in FIG. 6), a gas driver section (not shown in FIG. 6), any other suitable section of a piston engine cylinder (not shown), or any combination thereof. Blow-by may flow from combustion section 630 around the piston face 602 and axially along the piston assembly 610. In some embodiments, interaction of the blow-by and self-centering feature 616 may act to center piston assembly 610. For example, a pressure distribution may be generated in the clearance gap between piston assembly 610 and cylinder 620 that acts to center piston assembly 610. Blow-by may be supplied to a clearance gap from a combustion section, gas driver section, or other suitable section, operating at any suitable pressure (e.g., operating at a pressure of 20-800 bar, or other suitable pressure).

Figure 7:
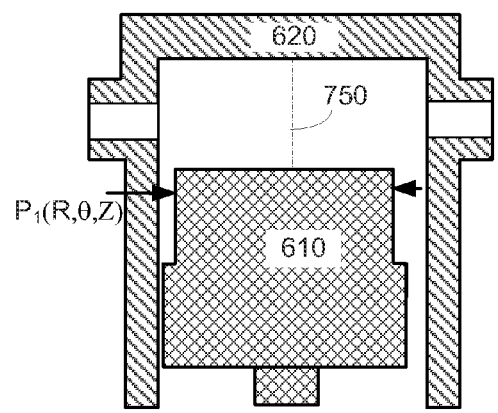
FIG. 7 shows a cross-section view of the illustrative piston assembly and cylinder of FIG. 6, in which the piston assembly is out of center, in accordance with some embodiments of the present disclosure.
Figure 8:
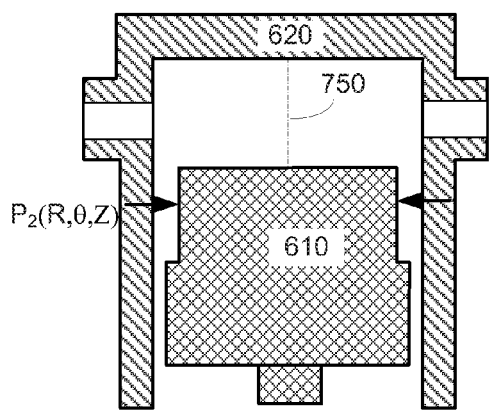
FIG. 8 shows a cross-section view of the illustrative piston assembly and cylinder of FIG. 6, in which the piston assembly is centered, in accordance with some embodiments of the present disclosure.

FIG. 7 shows a cross-section view of illustrative piston assembly 610 and cylinder 620, in which piston assembly 610 is out of center, in accordance with some embodiments of the present disclosure. Center axis 750 of cylinder 620 illustrates the geometric center axis of the bore of cylinder 620. When piston assembly 610 is off-centered in cylinder 620, as shown in FIG. 7, the pressure field $P_1(R,\theta,Z)$, in cylindrical coordinates relative to the piston assembly, along the lateral sides (i.e., at radius R which may vary with $\theta$ and Z) of piston assembly 610 may be circumferentially (i.e., in the $\theta$ direction) non-uniform at a given axial position Z. FIG. 8 shows a cross-section view of illustrative piston assembly 610 and cylinder 620, in which piston assembly 610 is centered about center axis 750, in accordance with some embodiments of the present disclosure. When piston assembly 610 is centered in cylinder 620, as shown in FIG. 8, the pressure field $P_2(R,\theta,Z)$ of piston assembly 610 may be substantially circumferentially uniform at a given axial position Z. In some embodiments, the pressure field of the centered piston may be non-uniform, but when integrated over the lateral surface of the piston, give a substantially zero resultant force. For example, a piston assembly having slotted pockets may have a non-uniform circumferential pressure field due to the pockets, but may provide a resultant force of zero.

Figure 9:
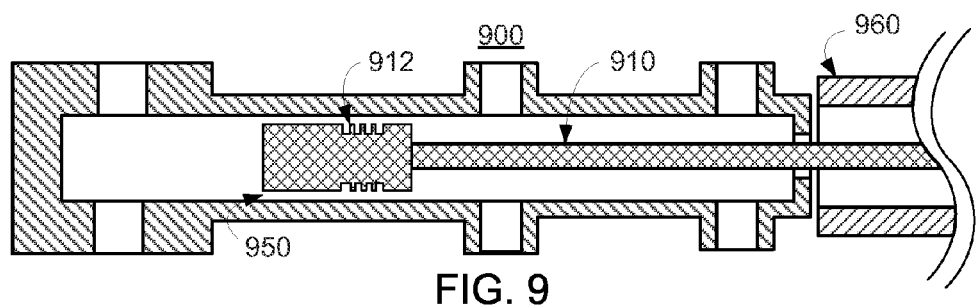
FIG. 9 shows a cross-section view of a portion of an illustrative piston engine with a piston assembly having a feature that may aid in centering the piston assembly, in accordance with some embodiments of the present disclosure.

FIG. 9 shows a cross-section view of a portion of an illustrative piston engine 900 with a piston assembly 910 having a feature 912 that may aid in centering piston assembly 910, in accordance with some embodiments of the present disclosure. In some embodiments, a feature such as feature 912 may be included along with a self-centering feature (e.g., any of the self-centering features of FIGS. 10-12) in a piston assembly. Feature 912, as illustrated in FIG. 9, may include one or more groove extending around the full circumference of piston assembly 910, which may aid in equalizing the pressure field in clearance gap 950 of FIG. 9. Feature 912 may also act as a straight-through labyrinth seal to reduce the axial flow rate in clearance gap 950. Although shown illustratively as grooves in FIG. 9, any suitable feature or combination of features thereof may be used to aid in centering, in accordance with the present disclosure.

Figure 10:
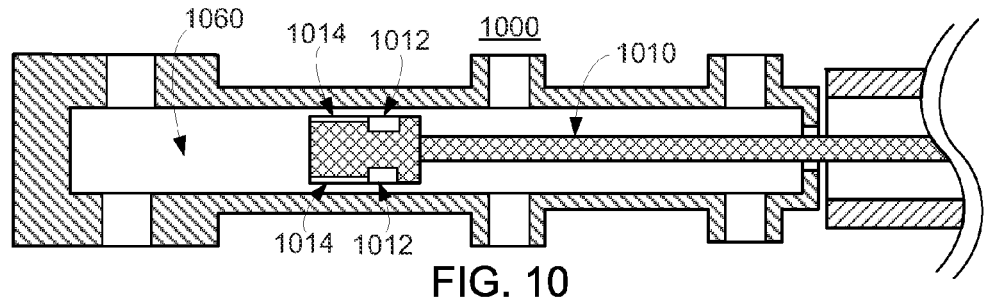
FIG. 10 shows a cross-section view of a portion of an illustrative piston engine with a piston assembly having a pocketed self-centering feature, in accordance with some embodiments of the present disclosure.

FIG. 10 shows a cross-section view of a portion of an illustrative piston engine 1000 with a piston assembly 1010 having a pocketed self-centering feature 1012, with one or more slots 1014, in accordance with some embodiments of the present disclosure. Self-centering feature 1012 may include one or more pockets each extending partially around the circumference of piston assembly 1010. Slots 1014 may include one or more slots (e.g., corresponding to the one or more pockets) that may act as a guide for blow-by to flow into the pockets. Although shown as being located on a lateral surface of piston assembly 1010, in some embodiments, slots may be included in the interior of a piston assembly, and may be fed from any suitable source. For example, self-centering feature 1012 may include three slotted pockets, each centered 120° apart on the circumference and each extending less than 120° along the circumference, and three corresponding slots 1014 that may allow fluid from a relatively high pressure region 1060 to flow into the pockets. Any suitable arrangement of segmented pockets, including any suitable number of pockets, may be used in accordance with the present disclosure.

Figure 11:
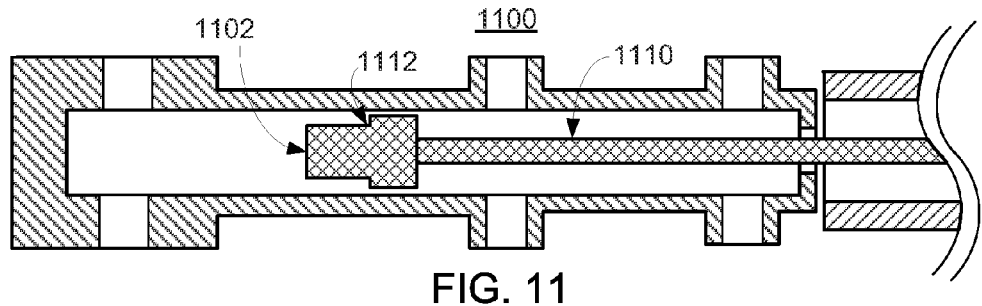
FIG. 11 shows a cross-section view of a portion of an illustrative piston engine with a piston assembly having a stepped self-centering feature, in accordance with some embodiments of the present disclosure.

FIG. 11 shows a cross-section view of a portion of an illustrative piston engine 1100 with a piston assembly 1110 having a stepped self-centering feature 1112, in accordance with some embodiments of the present disclosure. Self-centering feature 1112 may include a step extending around the full circumference of piston assembly 1110. The step may include any suitable absolute and/or relative dimensions. In an illustrative example, the clearance gap in the step (i.e., relatively nearer to the piston face 1102) may be on the order of twice the clearance gap at the larger diameter region of the piston assembly. In some embodiments, a piston assembly may include a segmented step, similar to the slotted pocket arrangement of FIG. 10 but in which the pockets extend through to the piston face 1102, and accordingly slots need not be included.

Figure 12:
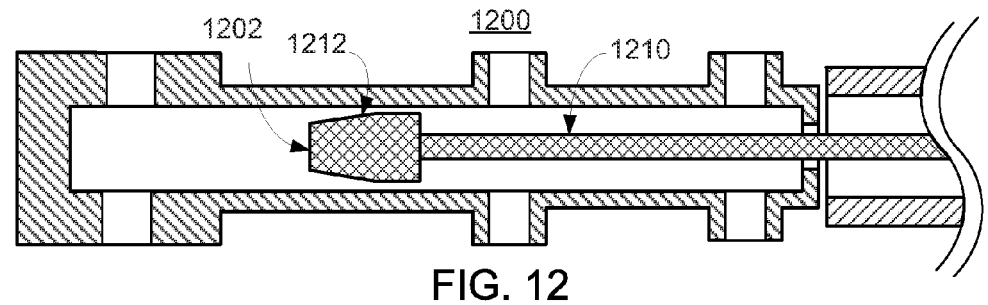
FIG. 12 shows a cross-section view of a portion of an illustrative piston engine with a piston assembly having a tapered self-centering feature, in accordance with some embodiments of the present disclosure.

FIG. 12 shows a cross-section view of a portion of an illustrative piston engine 1200 with a piston assembly 1210 having a tapered self-centering feature 1212, in accordance with some embodiments of the present disclosure. Self-centering feature 1212 may include a tapered portion extending around the full circumference of piston assembly 1210, in which the diameter at piston face 1202 is relatively contracted. The taper may include any suitable absolute and/or relative dimensions. In an illustrative example, the clearance gap at the small diameter of the taper (i.e., relatively nearer to the piston face 1202) may be on the order of twice the clearance gap at the larger diameter region of the piston assembly. In some embodiments, a piston assembly may include more than one tapered sections around the circumference, similar to the slotted pocket arrangement of FIG. 10, in which the taper extends through to the piston face 1202.

In some embodiments, any or all of self-centering features 1012, 1112, and 1212, feature 912, and other suitable self-centering features or other features may be combined. For example, a piston assembly may include a taper, a step, and a series of grooves (e.g., a labyrinth) to provide centering. Self-centering features may be used near a piston face in contact with a combustion section, gas driver section, gas spring section, any other suitable piston face that allows blow-by gas to flow past the piston face, or any combination thereof. For example, referencing piston engine 300 of FIG. 3, self-centering features may be included near any of piston faces 312.

Non-Contact Bearings

In some embodiments, a non-contact bearing may be used between a piston and a corresponding cylinder. A non-contact bearing may include, for example, an aerostatic bearing, a hydrostatic bearing, or other suitable non-contact bearing that may be moving or stationary. Non-contact bearings may include a thin film of fluid that separates the piston and cylinder wall, reducing friction and associated work losses. In some embodiments, the use of aerostatic bearings may allow for oil-less operation of the piston and cylinder assembly of a piston engine, and accordingly the piston engine need not require an auxiliary oil system, which may simplify some aspects of the engine architecture. In some embodiments, non-contact bearings may include oil as the bearing fluid. The bearing fluid may include, for example, air, nitrogen, exhaust, oil, liquid water, water vapor, liquid $CO_2$, gaseous $CO_2$, hydraulic fluid, any other suitable fluid, or any combination thereof. The fluid used in the fluid bearing may be supplied through a piston assembly, a cylinder, or both.

Figure 13:
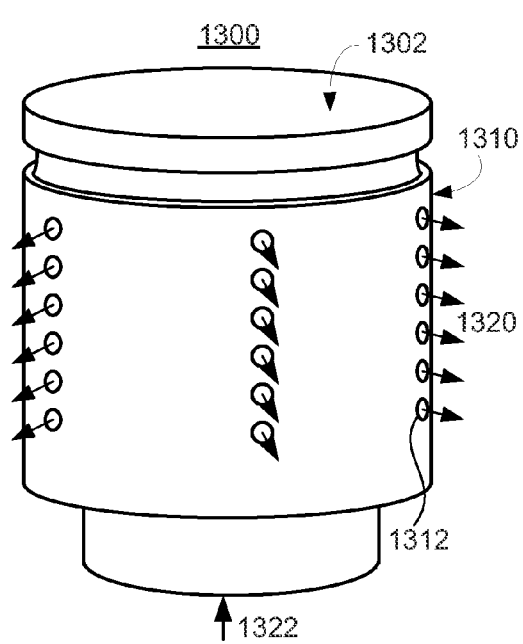
FIG. 13 shows a perspective view of a portion of an illustrative piston assembly with a bearing element having holes, in accordance with some embodiments of the present disclosure.

FIG. 13 shows a perspective view of a portion of an illustrative piston assembly 1300 with a bearing element 1310 having holes 1312, in accordance with some embodiments of the present disclosure. Holes 1312 may be arranged in a pattern, arranged randomly, or any combination thereof. Holes 1312 may have any suitable dimensions. For example, in some embodiments, holes 1312 may range from thousandths of an inch or less, to an eighth of an inch or larger. In some embodiments, the dimensions of holes 1310 may be selected based on the relative flow restriction or effective area of the holes to one or more other flow restrictions or effective areas. For example, the holes may be sized to provide a flow restriction of the same order as a flow restriction of the exhaust path of the bearing fluid downstream of holes 1310. As piston assembly 1300 translates in the bore of a suitable cylinder due to forces on piston face 1302, or other suitable piston face (not shown) of piston assembly 1300, bearing element may aid in maintaining centering. Fluid may be supplied from any suitable fluid source, as shown by arrow 1322, and may be distributed within piston assembly 1300 via internal fluid passages (not shown) to holes 1312. After exiting holes 1312, the fluid may flow through the clearance gap, and along at least a portion of piston assembly 1300. The outward flow of fluid, shown by arrows 1320, from bearing element 1310 may aid in preventing and/or reducing piston assembly-cylinder contact.

Although shown as holes in FIG. 13, any suitable ports may be used to provide fluid to the clearance gap to act as a fluid bearing. For example, a gap between mating parts may be used to provide fluid to the clearance gap. In a further example, an orifice in the shape of a ring, extending partially or fully around the circumference of the piston assembly, may be used to provide fluid to the clearance gap. In some embodiments, bearing element 1310 may include ports sufficiently small (e.g., smaller than the mean free path of the bearing fluid) to permit effusion.

Figure 14:
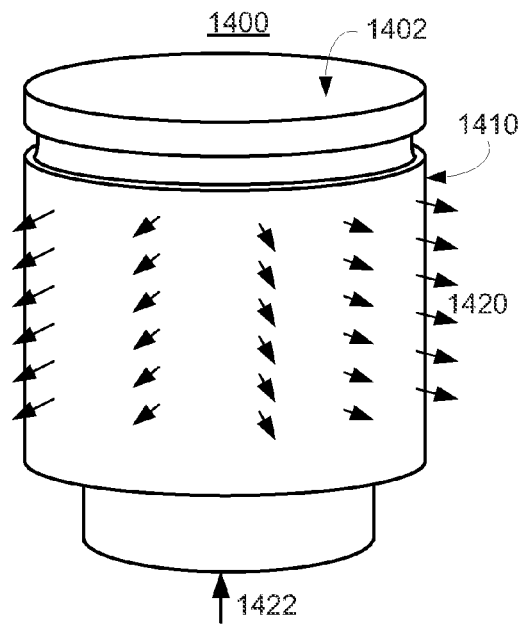
FIG. 14 shows a perspective view of a portion of an illustrative piston assembly with a porous bearing element, in accordance with some embodiments of the present disclosure.

FIG. 14 shows a perspective view of a portion of an illustrative piston assembly 1400 with a porous bearing element 1410, in accordance with some embodiments of the present disclosure. As piston assembly 1400 translates in the bore of a suitable cylinder due to forces on piston face 1402, or other suitable piston face (not shown) of piston assembly 1400, bearing element may aid in maintaining centering. Fluid may be supplied from any suitable fluid source, as shown by arrow 1422, and may be distributed within piston assembly 1400 via internal fluid passages (not shown), and then may flow though void space of any suitable portion of bearing element 1410. Bearing element 1410 may have any suitable porosity and pore size. After exiting the lateral surface of bearing element 1410, the gas may flow through the clearance gap, and along at least a portion of piston assembly 1400. The outward flow of fluid from bearing, as shown by arrows 1420, element 1410 may aid in preventing and/or reducing piston assembly-cylinder contact. Bearing element 1410 may be constructed from any suitable material having porosity that may allow a fluid to flow. For example, a porous bearing element may be constructed from graphite, sintered metal (e.g., iron, steel, bronze), sintered or otherwise porous ceramic (e.g., silicon carbide, alumina, magnesia), any other suitable material sintered or otherwise, or any combination thereof. In some embodiments, bearing element 1410 may have a pore size sufficiently small (e.g., smaller than the mean free path of the bearing fluid) to permit effusion.

Figure 15:
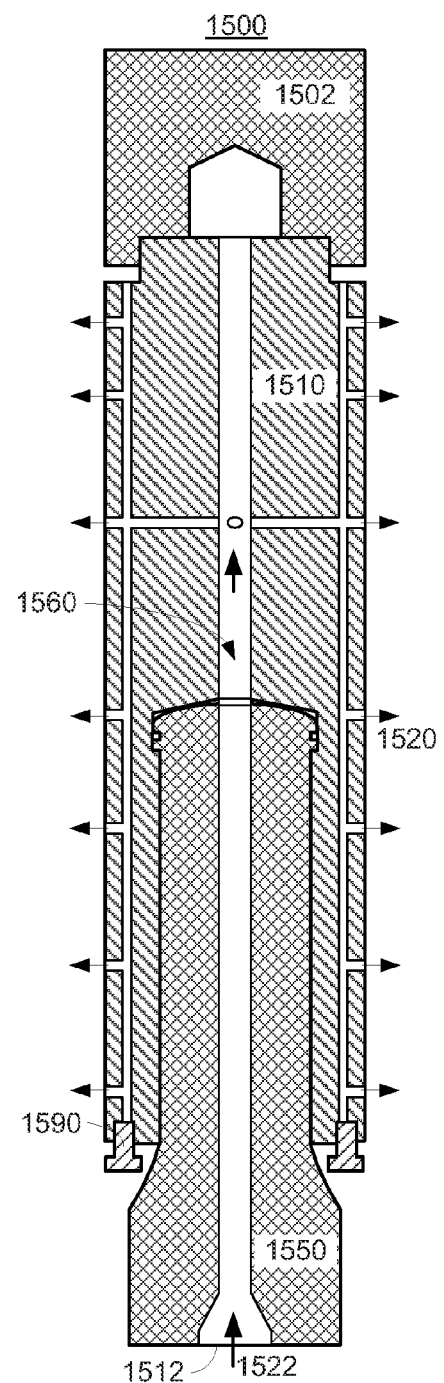
FIG. 15 shows a cross-section view of an illustrative piston assembly, with a fluid bearing fed through the piston assembly, in accordance with some embodiments of the present disclosure.

FIG. 15 shows a cross-section view of an illustrative piston assembly 1500, with a fluid bearing 1510 fed through the piston assembly 1500, in accordance with some embodiments of the present disclosure. Piston assembly 1500 may include piston 1502, bearing element 1510, frame 1550, fastener 1590, any other suitable components not shown in FIG. 15, or any combination thereof. Piston assembly 1500 may be configured to fit in the bore of a cylinder of a piston engine, and may be configured to translate substantially along an axis on or near the centerline of the bore. Bearing element 1510 includes fluid passages 1560, which may distribute bearing fluid from one or more inlet ports 1512, as shown by arrow 1522, to one or more ports or surfaces to flow radially outwards, as shown by arrows 1520. In some embodiments, bearing element 1510 may include an assembly of multiple components. In some embodiments, piston 1502 may optionally include a self-centering feature, or other suitable feature (not shown).

Figure 16:
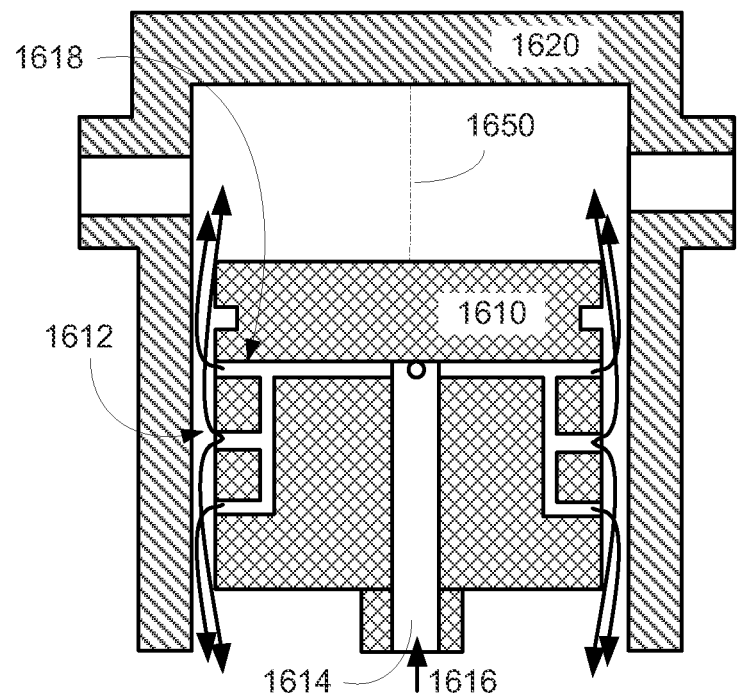
FIG. 16 shows a cross-section view of an illustrative piston assembly and cylinder, with a fluid bearing fed through the piston assembly, in accordance with some embodiments of the present disclosure.

FIG. 16 shows a cross-section view of an illustrative piston assembly 1610 and cylinder 1620, with fluid bearing 1612 (e.g., the fluid layer located in the clearance gap originating at least in part from bearing element 1618) fed through the piston assembly 1610, in accordance with some embodiments of the present disclosure. Piston assembly 1610 includes internal passages 1614, which may receive bearing fluid 1616. Bearing element 1618 is the portion of piston assembly 1610 that includes holes or a porous portion from which bearing fluid may flow into fluid bearing 1612. Bearing element 1618 may be an integral part of a piston (as shown in FIG. 16), another portion of piston assembly 1610, a separate component mated to piston assembly 1610 (e.g., by press fitting or mounting with fasteners), have any other suitable arrangement, or any combination thereof. Fluid bearing 1612 may aid in centering piston assembly 1610 about axis 1650, which represents the center of the bore of cylinder 1620.

Figure 17:
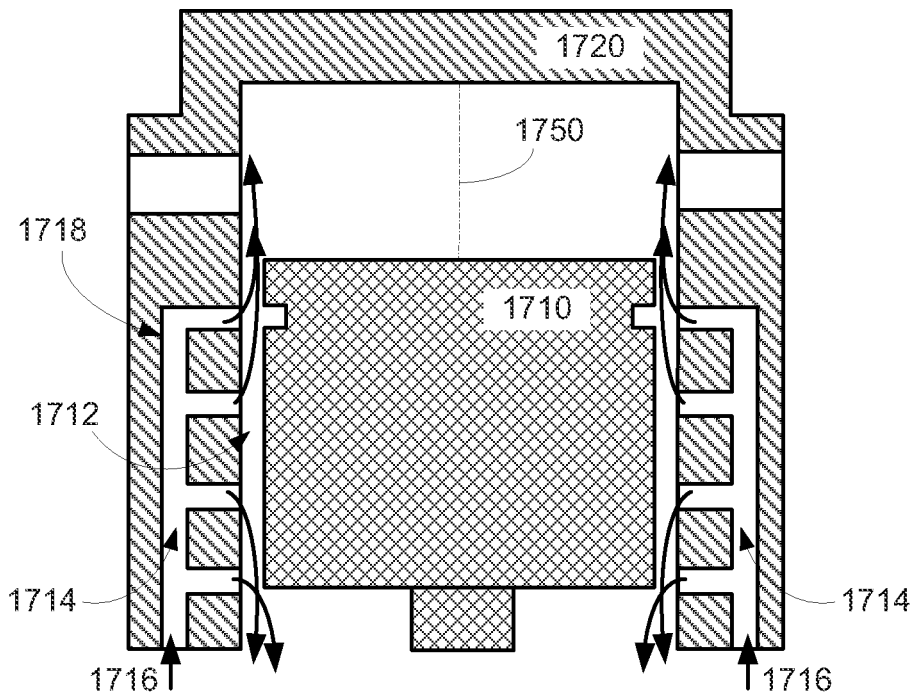
FIG. 17 shows a cross-section view of an illustrative piston assembly and cylinder, with a fluid bearing fed through the cylinder, in accordance with some embodiments of the present disclosure.

FIG. 17 shows a cross-section view of an illustrative piston assembly 1710 and cylinder 1720, with fluid bearing 1712 fed through the cylinder 1720, in accordance with some embodiments of the present disclosure. Cylinder 1720 includes internal passages 1714, which may receive bearing fluid 1716. Bearing element 1718 is the portion of cylinder 1720 that includes holes or an effusive surface from which fluid may flow into fluid bearing 1712 in a suitable clearance gap between piston assembly 1710 and cylinder 1720. Bearing element 1718 may be an integral part of cylinder 1720 (as shown in FIG. 17), a separate component mated to cylinder 1720 (e.g., such as an insert or liner), have any other suitable arrangement, or any combination thereof. Fluid bearing 1712 may aid in centering piston assembly 1710 about axis 1750, which represents the center of the bore of cylinder 1720. In some embodiments, a cylinder may include one or more bearing elements, which may provide bearing fluid to one or more corresponding fluid bearings. For example, in some embodiments, the bore of a cylinder may include multiple bearing elements, each with a separate and controllable fluid source, which may feed bearing fluid into multiple locations in the bore the cylinder.

In some embodiments, blow-by gas may be routed to reduce or prevent flow of blow-by gas in the portion of a clearance gap adjacent to the bearing element. For example, blow-by gas may by routed through the cylinder, piston assembly, or both, so that the flow of blow-by gas does not substantially alter the flow of bearing fluid in the clearance gap. Some alterations of bearing gas flow by other flows such as, for example, blow-by gas, may adversely affect the ability of the bearing fluid to prevent piston-cylinder contact. Routing of the blow-by gas may, for example, allow the bearing fluid exhaust pressure to be relatively far below the fluid feed pressure (e.g., allow a larger pressure drop of the bearing fluid), which may provide desired flow and bearing characteristics.

Figure 18:
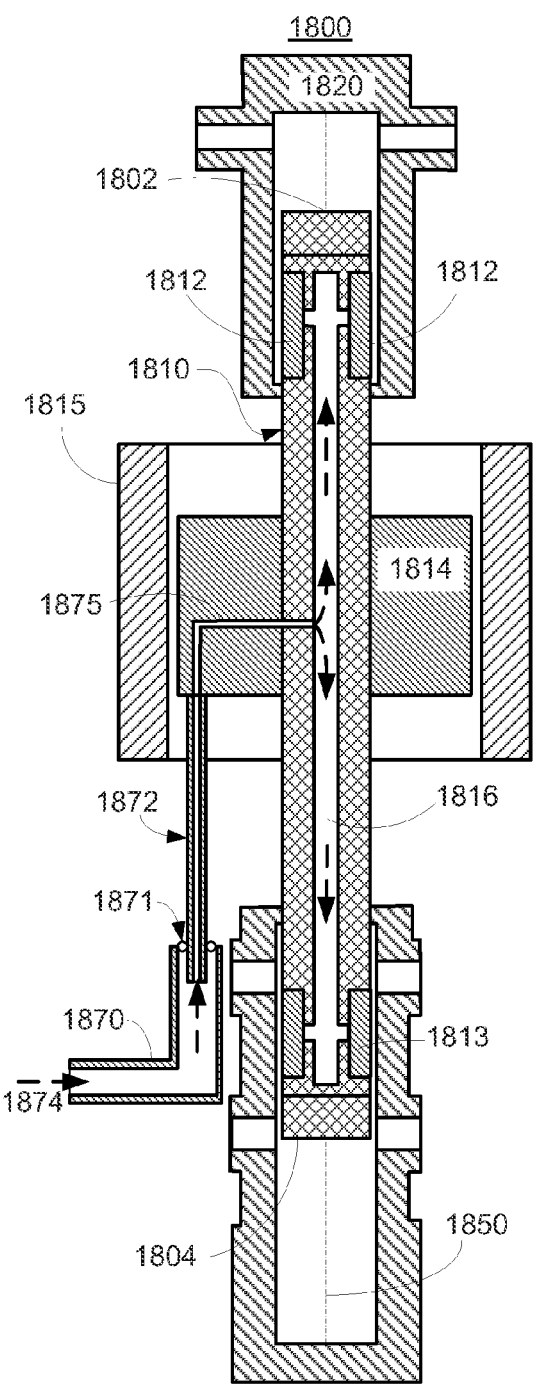
FIG. 18 shows a cross-section view of an illustrative arrangement of a piston assembly and cylinder, having fluid bearings and a translator having a fluid passage, in accordance with some embodiments of the present disclosure.

FIG. 18 shows a cross-section view of an illustrative arrangement 1800 of a piston assembly 1810 and cylinder 1820, with bearing elements 1812 and 1813 and a translator 1814 having fluid passage 1875, in accordance with some embodiments of the present disclosure. Piston face 1802 may contact a gas spring (e.g., gas driver section) of arrangement 1800, while piston face 1804 may contact a combustion section of arrangement 1800. Arrangement 1800 may include stator 1815, which may interact electromagnetically with translator 1814.

In the illustrated embodiments, bearing fluid 1874 is supplied to conduit 1870, to which conduit 1872 is connected via seal 1871. Seal 1871, as illustrated in FIG. 18, may allow piston assembly 1810, including conduit 1872, to translate about axis 1850, while maintaining a pressure seal between conduit 1870 and 1872. The interior of conduit 1872 is coupled to fluid passage 1875, located in translator 1814, from which bearing fluid 1874 may flow into passage 1816. Passage 1816 feeds bearing fluid 1874 to bearing elements 1812 and 1813, from which bearing fluid 1874 flows into fluid bearings within a clearance gap between piston assembly 1810 and cylinder 1820. In some embodiments (not shown), conduit 1870, conduit 1872, or both, may be flexible to allow relative motion. For example, in some embodiments (not shown), conduit 1870 may be a flexible hose connected directly to translator 1814 via a suitable hose fitting (e.g., and accordingly conduit 1872 need not be included).

Figure 19:
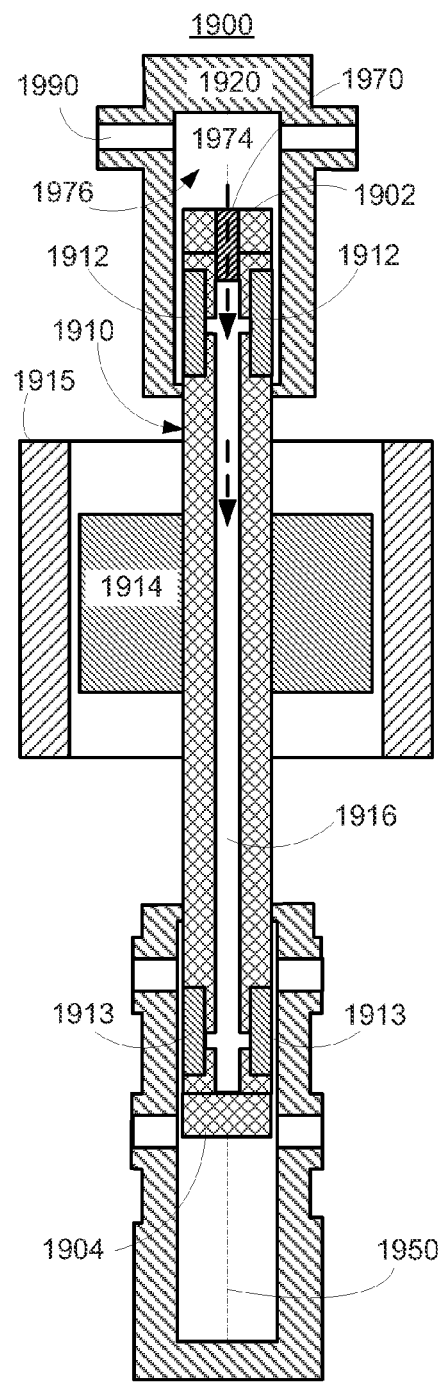
FIG. 19 shows a cross-section view of an illustrative arrangement of a piston assembly and cylinder, having fluid bearings and a check valve, in accordance with some embodiments of the present disclosure.

FIG. 19 shows a cross-section view of an illustrative arrangement 1900 of a piston assembly 1910 and cylinder 1920, with bearing elements 1912 and 1913 and a valve 1970, in accordance with some embodiments of the present disclosure. Piston face 1902 may contact a gas spring (e.g., gas driver section) of arrangement 1900, while piston face 1904 may contact a combustion section of arrangement 1900. Arrangement 1900 may include stator 1915, which may interact electromagnetically with translator 1914.

In the illustrated embodiments, at least a portion of the fluid of gas spring 1976 is supplied to passage 1916 as bearing fluid via valve 1970 (e.g., as shown by arrow 1974), located in piston face 1902. Valve 1970 may include an active or passive valve, or other suitable ported device, that provide control of fluid flow in one or more directions. For example, valve 1970 may include a reed valve, ball valve, needle valve, ball check valve, diaphragm check valve, a static flow restriction within a conduit providing different resistances for different flow directions, any other suitable valve, an electronic controller or other active positioning system, any other suitable device, or any combination thereof. Passage 1916 feeds bearing fluid 1974 to bearing elements 1912 and 1913, from which bearing fluid flows into fluid bearings within a clearance gap between piston assembly 1910 and cylinder 1920. In some embodiments, valve 1970 may be a check valve. Accordingly, as piston assembly 1910 translates along axis 1950, and as fluid is supplied and/or removed from gas spring 1976 via ports 1990 (e.g., which may include one or more valves), the pressure in gas spring 1976 may reach the cracking pressure, and the fluid may flow through valve 1970 into passage 1916. The cracking pressure of valve 1970 may be any suitable value, and in some embodiments, may be actively adjustable. In some embodiments, valve 1970 may be actively controllable, and the flow in either direction may be controlled by controlling an orifice or other flow restriction of valve 1970.

In some embodiments, a bearing element may be an integral part of a piston. For example, a piston may have a collection of machined passages and holes that provide bearing fluid to a clearance gap. In some such embodiments, the piston may, but need not, be a part of a piston assembly. A bearing element may include a graphite element, a metal element with machined features, a sintered metal element, a porous ceramic element, a nonporous ceramic element, any other suitable element of a suitable material, or any combination thereof.

Temperature Management of Cylinder and/or Piston

In some embodiments, the temperature of a piston (or assembly thereof), cylinder, or both may be controlled or otherwise managed. Temperature management of a piston (or assembly thereof) and/or a cylinder may aid in maintaining or otherwise managing a clearance gap, by managing thermal deformation of one or more components of a piston engine.

In some embodiments, one or more heat pipes may be used to affect heat transfer of a piston assembly. A heat pipe may include a fluid conduit configured to aid in heat transfer to and from, for example, components of a piston engine. The piston face of a piston assembly may experience elevated temperatures due to combustion. The use of a heat pipe may aid in transferring heat away from the piston face, any other suitable portion of a piston assembly, or any other suitable component, to reduce the operating temperature of the component. For example, a heat pipe may transfer heat from a piston face to a heat receptacle such as a bearing element, a clearance gap, a surface of the bore of the cylinder, a piston rod cooled by a coolant, any other suitable heat receptacle, or any combination thereof.

A heat pipe may include a fluid conduit, which may be filled with a suitable fluid such as, for example, water, ethanol, ammonia, sodium, or any other suitable fluid or mixture. The latent heat associated with a phase transition of the fluid is generally much greater than the transfer of sensible energy due to a temperature difference. Additionally, the phase transition of the fluid may occur at a substantially constant or otherwise limited temperature (which may depend on pressure and any impurities present), which may aid in reducing relatively large temperature gradients within the piston engine. The heat pipe may be arranged as part of the piston assembly, in thermal contact with the piston face of the piston assembly. In some embodiments, linear motion of a piston assembly having a heat pipe may aid in transporting the fluid within the heat pipe, thus aiding in heat transfer from a piston face to a relatively cooler portion of the piston engine.

It will be understood that the phrase "thermal contact" between components shall refer to the capability of operative heat transfer between the components. For example, a heat pipe may be arranged in contact with a piston face, and may transfer heat from the piston face, and thus may be in "direct" thermal contact with the piston face. In a further example, a heat pipe may be in contact with a piston frame, which may be in contact with a piston face, and the heat pipe may transfer heat from the piston frame, which may transfer heat from the piston face, and thus the heat pipe may be in "indirect" thermal contact with the piston face.

Figure 20:
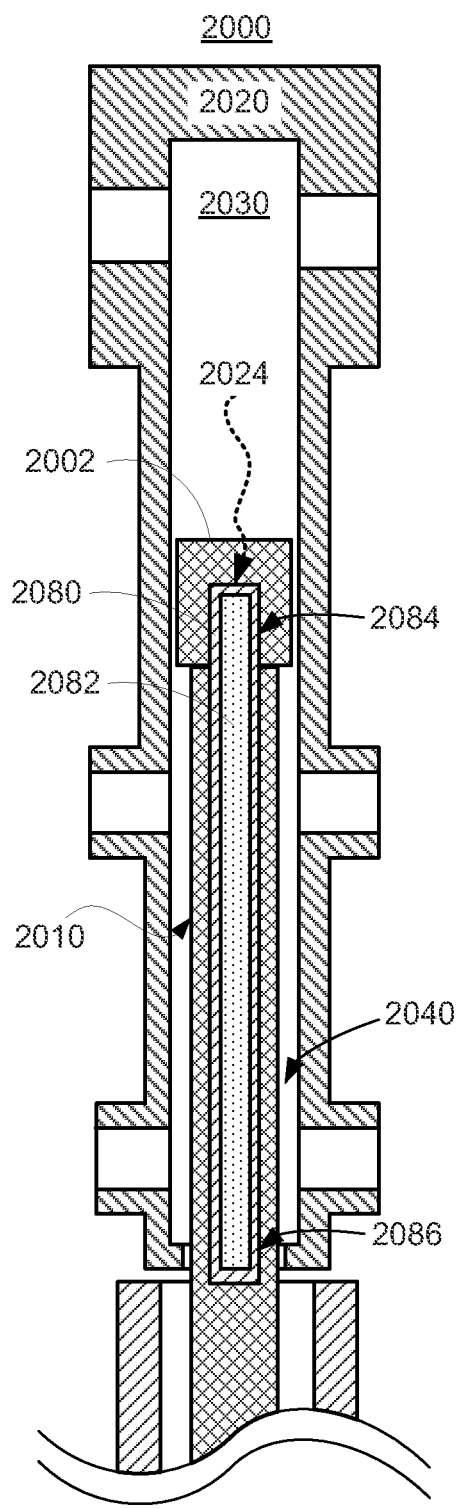
FIG. 20 shows a cross-section view of an illustrative piston assembly and cylinder, with a heat pipe included as part of the piston assembly, in accordance with some embodiments of the present disclosure.

FIG. 20 shows a cross-section view of an illustrative piston assembly 2010 and cylinder 2020, of piston engine 2000, with a heat pipe 2080 included as part of the piston assembly, in accordance with some embodiments of the present disclosure. Heat pipe 2080, which may be a pipe or other fluid conduit, may include fluid 2082, which may undergo a vapor-liquid phase transition during operation of piston engine 2000. Heat transfer (shown by arrow 2024) may occur from combustion section 2030 to piston face 2002 during engine operation. Heat transfer (shown by arrow 2024) may further occur from piston face 2020 to a portion 2084 of heat pipe 2080, which may aid in reducing, maintaining, or both, the temperature of piston face 2020. Heat transfer within heat pipe 2080 may occur from portion 2084 of heat pipe 2080 to portion 2086 of heat pipe 2080. Portion 2086 may transfer heat to a portion of piston assembly 2010 away from piston face 2002 such as, for example, the end of cylinder 2020 distal to combustion section 2030 and relatively near portion 2086. For example, heat pipe 2080 may aid in transferring heat 2024 from combustion section 2030 radially outward to a bearing face, the clearance gap and then the cylinder, where it may be further transferred, for example, via coolant in a coolant passage. In a further example, heat pipe 2080 may aid in transferring heat from combustion section 2024 to gas driver section 2040 of cylinder 2020.

Figure 21:
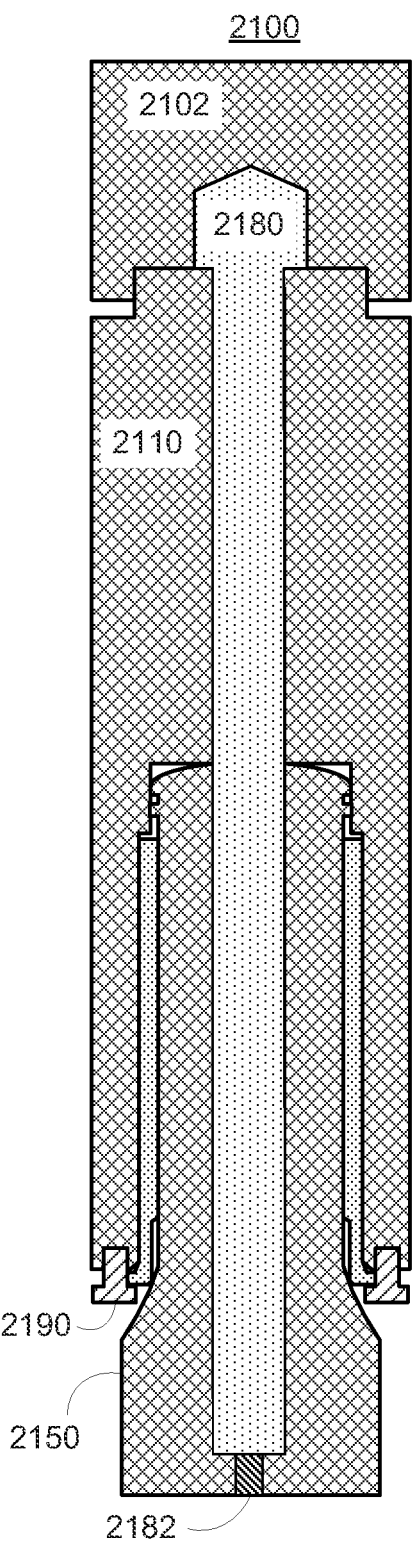
FIG. 21 shows a cross-section view of an illustrative piston assembly with a heat pipe formed by an interior void, in accordance with some embodiments of the present disclosure.

FIG. 21 shows a cross-section view of an illustrative piston assembly 2100 with a heat pipe 2180 formed by an interior void, in accordance with some embodiments of the present disclosure. Piston assembly 2100 may include piston 2102, element 2110, frame 2150, fastener 2190, any other suitable components not shown in FIG. 21, or any combination thereof. Piston assembly 2100 may be configured to fit in the bore of a cylinder of a piston engine, and may be configured to translate substantially along an axis on or near the centerline of the bore. Element 2110 may include (although not shown) a bearing element (e.g., with bearing passages), piston rings, a frame, any other suitable components, any other suitable features, or any combination thereof. Fluid within heat pipe 2180 may be filled, vented, or otherwise adjusted using port 2182, which may include a valve (e.g., a check valve, or shut-off valve), plug, or other component. In some embodiments, heat pipe 2180, with port 2182, may be capable of being filled, vented, or otherwise adjusted during operation of the piston engine. In some embodiments, heat pipe 2180, with port 2182, need not be capable of being filled, vented, or otherwise adjusted during operation of the piston engine, and may accordingly be adjusted while the piston engine is not operating.

In some embodiments, multiple heat pipes may be included on a diameter near the perimeter of a piston assembly to aid in transferring heat from a piston face to a clearance gap and an inner cylinder wall. In an illustrative example, six to twelve heat pipes may be oriented axially, arranged on a diameter near the perimeter of a piston assembly, although any suitable number of heat pipes may be used in such an annular arrangement. In some embodiments, an annular heat pipe may be included in a piston assembly to aid in transferring heat to the clearance gap. For example, an annular void within a piston assembly may be filled with a suitable fluid and sealed during operation.

Figure 22:
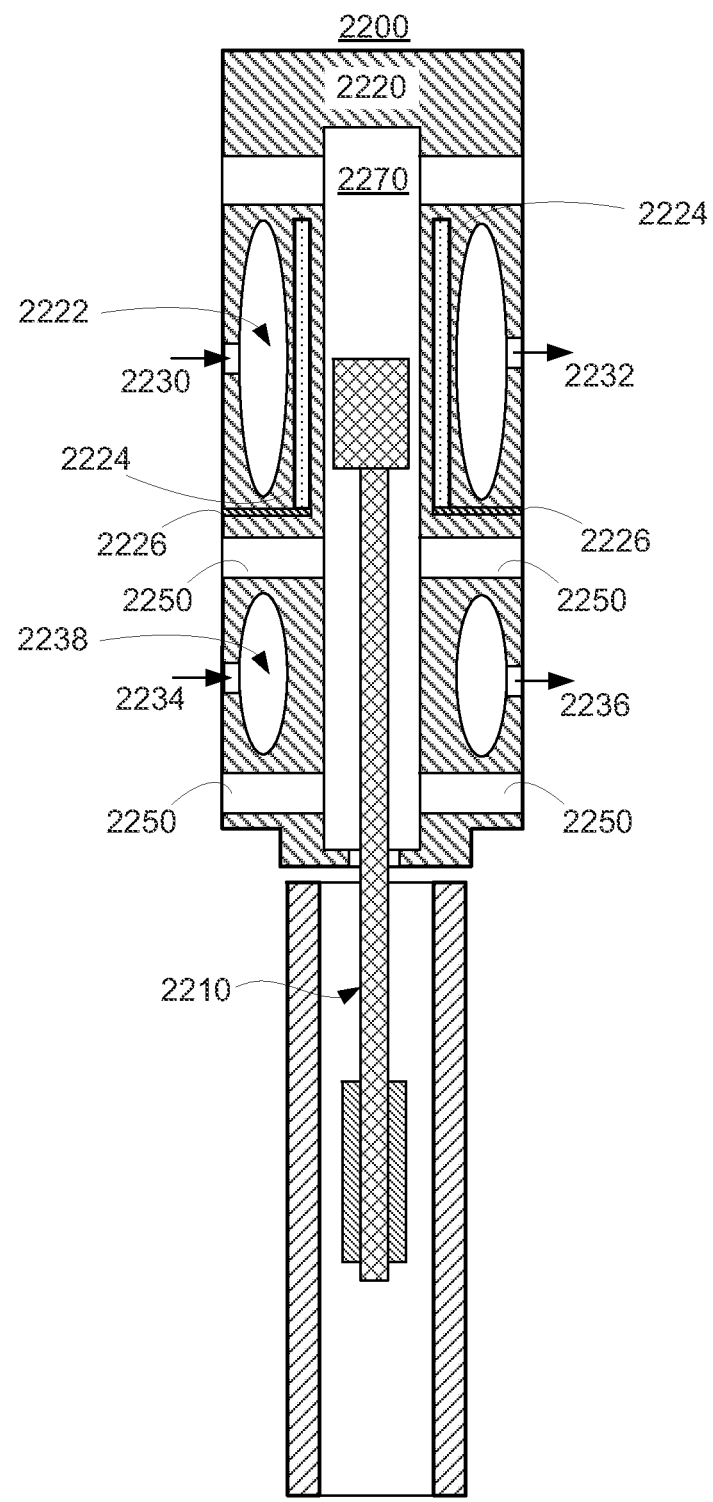
FIG. 22 shows a cross-section view of an illustrative piston engine having a piston assembly, and a cylinder having coolant passages and heat pipes, in accordance with some embodiments of the present disclosure.

FIG. 22 shows a cross-section view of an illustrative piston engine 2200 having a piston assembly 2210, and a cylinder 2220 having coolant passages 2222 and 2238 and heat pipes 2224, in accordance with some embodiments of the present disclosure. In some embodiments, piston engine 2200 may include coolant passages 2222 to aid in controlling or otherwise limiting the temperatures of one or more components of piston engine 2200. Temperature control may also be used to control a size and/or shape of a cylinder bore (e.g., by controlling thermal deformation), which may improve or otherwise adjust blow-by characteristics and/or bearing performance. As shown illustratively in FIG. 22, cylinder 2220 may include internal passages, fed by one or more ports, which may supply and return a coolant fluid, as shown by arrows 2230 and 2234, and arrows 2232 and 2236, respectively. As shown, coolant passages 2222 and coolant passages 2238 include annular voids, although any suitable arrangement may be used in accordance with the present disclosure. In some embodiments, a coolant such as ethylene glycol, propylene glycol, water, alcohol, air, any other suitable fluid, or any combination thereof (e.g., ethylene glycol diluted with water) may be supplied to coolant passages 2222 and 2238. In some embodiments (not shown), piston engine 2200 may include a coolant subsystem which may include a pump, radiator, temperature regulator, pressure regulator, fluid handling conduits, any other suitable components, or any combination thereof. In some embodiments, coolant passages 2222 and coolant passages 2238 may be interconnected within cylinder 2220, and accordingly may be controlled as a single set of passages. In some embodiments, coolant passages 2222 and coolant passages 2238 need not be interconnected within cylinder 2220, and may be separately controllable. For example, in some embodiments, coolant passages 2222 and coolant passages may aid in selectively cooling different zones of cylinder 2220, and accordingly each zone may be cooled separately. In an illustrative example, a control system may determine that a clearance gap between piston assembly 2210 and cylinder 2220, when the piston is in combustion section 2270, is too large. Accordingly, the flow rate of coolant supplied to coolant passages 2222, relatively nearer to TDC than coolant passages 2238, may be increased to cool the cylinder and reduce the bore (via thermal contraction), and hence reduce the clearance gap. Any suitable number of separate coolant passages may be used to provide selective cooling, arranged in any suitable configuration, in accordance with the present disclosure. In some embodiments, cylinder 2220 may include one or more heat pipes 2224 to aid in controlling or otherwise limiting the temperatures of one or more components of piston engine 2200. One or more heat pipes 2224 may be included in any suitable arrangement in cylinder 2220, and may include any suitable heat pipe fluid. For example, one or more heat pipes 2224 may include multiple heat pipes arranged axially on a diameter centered at the center of the bore of cylinder 2220. In a further example, one or more heat pipes 2224 may include an annular void within cylinder 2220. Heat pipe ports 2226 may be used, in some embodiments, to supply, remove, or otherwise control fluid within one or more heat pipes 2224. For example, heat pipe ports 2226 may include valves, regulators, orifices, any other suitable features or devices, or any combination thereof to control properties of the one or more heat pipes 2224, or fluid contained therein. In some embodiments, coolant passages 2222 and/or coolant passages 2238 may directly contact (not shown) one or more heat pipes 2224, and may provide relatively increased heat transfer from the one or more heat pipes 2224. Although coolant passages 2222 and 2238 and one or more heat pipes 2224 are shown in FIG. 22, some embodiments (not shown in FIG. 22) may include either coolant passages and one or more heat pipes, and accordingly need not include both. The use of coolant passages 2222 and 2238 and one or more heat pipes 2224 together may, in some arrangements, provide relatively enhanced heat transfer as compared to the use of either alone. For example, heat may be transferred from the bore of cylinder 2220 to the one or more heat pipes 2224 via the clearance gap, and one or more heat pipes 2224 may transfer at least a portion of this heat to coolant within coolant passages 2222 and/or coolant passages 2238 (e.g., the heat transfer may include conduction through a portion of cylinder 2220).

In some embodiments, fluid supplied to any of ports 2250 may be used to cool piston assembly 2210, or portions thereof. For example, heat from a piston face of piston assembly 2210 may be transported to a piston rod of piston assembly 2210, and fluid supplied to any of ports 2250 may convectively cool a piston rod of piston assembly 2210.

In some embodiments, fluid bearings may aid in cooling of a piston assembly, cylinder, components thereof, any other suitable components of a piston engine, or any combination thereof. A bearing fluid may be supplied to a bearing element, which may direct the bearing fluid to a suitable clearance gap of a piston-cylinder assembly. The bearing fluid may aid in cooling at least a portion of the piston-cylinder assembly as it flows through the clearance gap. In some embodiments, the bearing fluid may flow substantially away from a combustion section through a clearance gap, and accordingly may carry heat away from the combustion section thus reducing the temperature of one or more components of the piston engine. In some embodiments, convection of bearing fluid through a clearance gap of a piston engine may increase the effective heat transfer rate between a piston face and another portion of a piston assembly and/or a cylinder. In some embodiments, one or more heat pipes may be included in a piston assembly having a bearing element. The one or more heat pipes may aid in maintaining the bearing element, or a portion of the bearing element thereof, nearly isothermal, which may aid in controlling thermal expansion and associated changes in a clearance gap. In some embodiments, the use of one or more heat pipes, coolant passages, bearing elements, any other suitable components, or any combination thereof, may aid in maintaining or otherwise managing a clearance gap, by managing thermal deformation of one or more components of a piston engine.

Cylinder Liner

In some embodiments, a clearance gap between a free piston and a cylinder may be controlled or otherwise managed. In some embodiments, a deformable cylinder liner may be used to adjust the clearance gap by adjusting the bore in which a piston assembly moves. In some embodiments, a liner fluid may be used to apply pressure to the deformable cylinder liner, which may deform based on a pressure difference between the faces of the cylinder liner. Liner fluid may include, for example, water, ethylene glycol, propylene glycol, oil, hydraulic fluid, fuel (e.g., diesel fuel), any other suitable fluid, or any suitable combination thereof.

Figure 23:
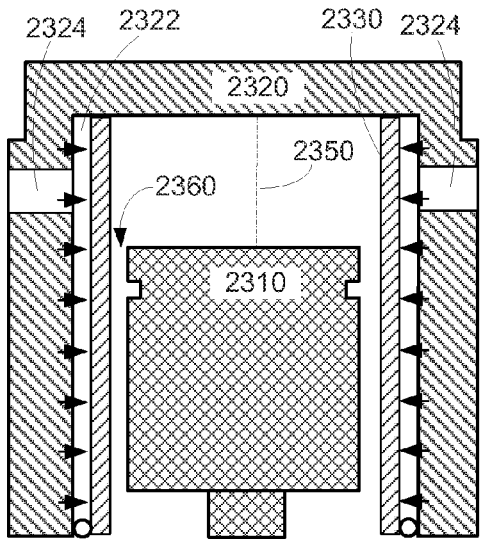
FIG. 23 shows a cross-section view of an illustrative piston assembly and cylinder, with a deformable cylinder liner, in accordance with some embodiments of the present disclosure.
Figure 24:
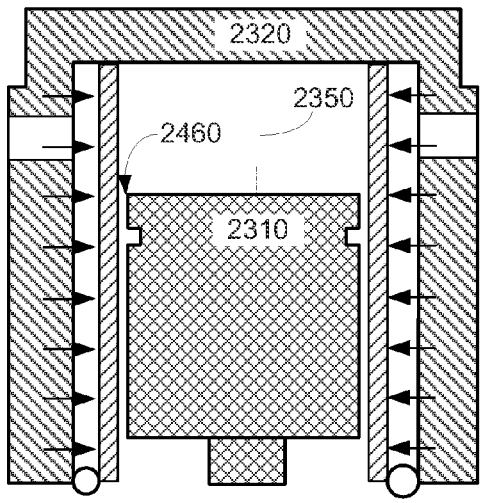
FIG. 24 shows a cross-section view of the illustrative piston assembly and cylinder of FIG. 23, with the deformable cylinder liner undergoing deformation, in accordance with some embodiments of the present disclosure.

FIG. 23 shows a cross-section view of an illustrative piston assembly 2310 and cylinder 2320, with a deformable cylinder liner 2330, in accordance with some embodiments of the present disclosure. The interior surface of deformable cylinder liner 2330 may define a bore, in which piston assembly 2310, or a portion thereof, may translate along axis 2350 at the center of the bore. Passages 2322 may be formed between cylinder 2320 and deformable cylinder liner 2330, into which a liner fluid may be supplied and/or returned via ports 2324. The liner fluid, controlled to a suitable pressure may impart a deforming force to deformable cylinder liner 2330, allowing the bore to be adjusted accordingly. The clearance gap 2360 between the bore and piston assembly 2310 may accordingly be adjusted by application of the liner fluid at a suitable pressure. Increasing the pressure of the liner fluid (e.g., by supplying liner fluid to passages 2322 via one or more of ports 2324) may reduce the bore and clearance gap 2360, while decreasing the pressure of the liner fluid (e.g., by removing liner fluid from passages 2322 via one or more of ports 2324) may increase the bore and clearance gap 2360. FIG. 24 shows a cross-section view of the illustrative piston assembly 2310 and cylinder 2320 of FIG. 23, with the deformable cylinder liner 2330 undergoing deformation, in accordance with some embodiments of the present disclosure. The liner fluid pressure is larger in passages 2322 as shown in FIG. 24 relative to that shown in FIG. 23, and accordingly clearance gap 2460 is relatively smaller than clearance gap 2360.

Figure 25:
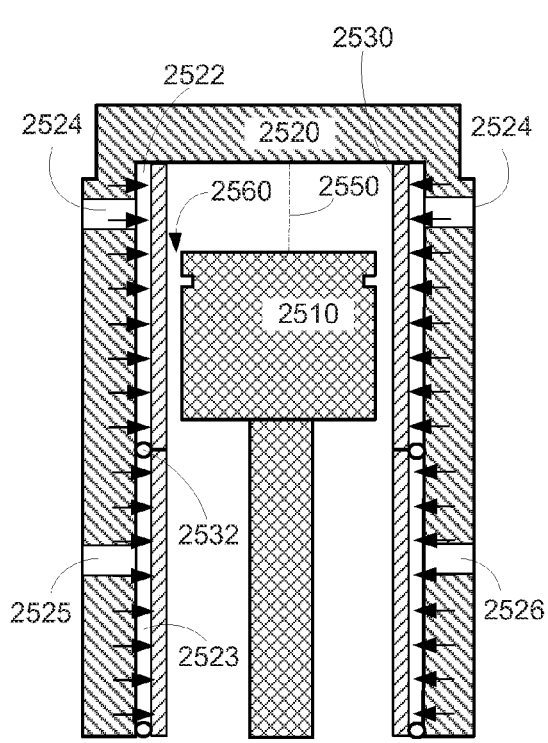
FIG. 25 shows a cross-section view of an illustrative piston assembly and cylinder, with a sectioned deformable cylinder liner, in accordance with some embodiments of the present disclosure.

FIG. 25 shows a cross-section view of an illustrative piston assembly 2510 and cylinder 2520, with a sectioned deformable cylinder liner 2530, in accordance with some embodiments of the present disclosure. The interior surface of deformable cylinder liner 2530 may define a bore, in which piston assembly 2510, or a portion thereof, may translate along axis 2550 at the center of the bore. Passages 2522 and 2523 may be formed between cylinder 2520 and deformable cylinder liner 2530, which may be separated by seal 2532. A liner fluid may be supplied to and/or returned from passages 2522 and 2523 via ports 2524 and ports 2525, respectively, which may be, but need not be, isolated from each other. Liner fluid, controlled to a suitable pressure, may impart a deforming force to deformable cylinder liner 2530, allowing the bore at each section (i.e., the portion of the bore corresponding to passages 2522 or 2523) to be adjusted accordingly. In some embodiments, the pressure of the liner fluid may be controlled based at least in part on the pressure within a suitable section of the bore, as the deformation of deformable cylinder liner 2530 may depend on a differential pressure between the liner fluid and the bore. The clearance gap 2560 between the bore and piston assembly 2510 may accordingly be adjusted by application of the liner fluid at a suitable pressure. The clearance gap may vary in the axial direction (i.e., parallel to axis 2550), because the clearance gap corresponding to each of passages 2522 and 2523 may be adjusted independently. For example, in some embodiments, as piston 2512 travels through a section of deformable cylinder liner 2530, the clearance gap may be adjusted at that section. Increasing the pressure of the liner fluid (e.g., by supplying liner fluid to passages 2522 and/or 2523 via one or more of respective ports 2524 and/or 2525) may reduce the bore and clearance gap 2560 at one or more locations, while decreasing the pressure of the liner fluid (e.g., by removing liner fluid from passages 2522 and/or 2523 via one or more of respective ports 2524 and/or 2525) may increase the bore and clearance gap 2560 at one or more locations.

Figure 26:
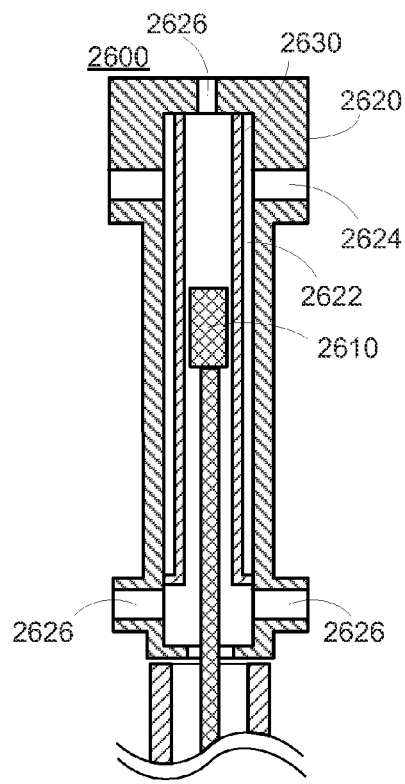
FIG. 26 shows a cross-section view of an illustrative piston engine, with a deformable cylinder liner, in accordance with some embodiments of the present disclosure.

FIG. 26 shows a cross-section view of an illustrative piston engine 2600, with a deformable cylinder liner 2630, in accordance with some embodiments of the present disclosure. Passages 2622 may be formed between cylinder 2620 and deformable cylinder liner 2630, into which a liner fluid may be supplied and/or returned via ports 2624. The liner fluid, controlled to a suitable pressure may impart a deforming force to deformable cylinder liner 2630, allowing the bore to be adjusted accordingly. In the illustrated embodiment, ports 2626 (e.g., which may provide fuel and/or air, or receive exhaust) may be located outside of deformable cylinder liner 2630 to eliminate the need for ports or other openings in deformable cylinder liner 2630. Adjustment of a clearance gap between piston assembly 2610 and deformable cylinder liner 2630 may be achieved by adjustment of the pressure of the liner fluid in passages 2622.

In some embodiments, flow of a liner fluid may be used to provide cooling for a deformable cylinder liner. For example, a pressure-controlled and flow-controlled liner fluid may be used to provide convective heat transfer away from a deformable cylinder liner (e.g., near a combustion section) to the liner fluid. Cooling with the use of a liner fluid may be used in concert with, or in place of, cooling with the use of coolant passages and/or heat pipes (e.g., as shown in FIG. 22).

Figure 27:
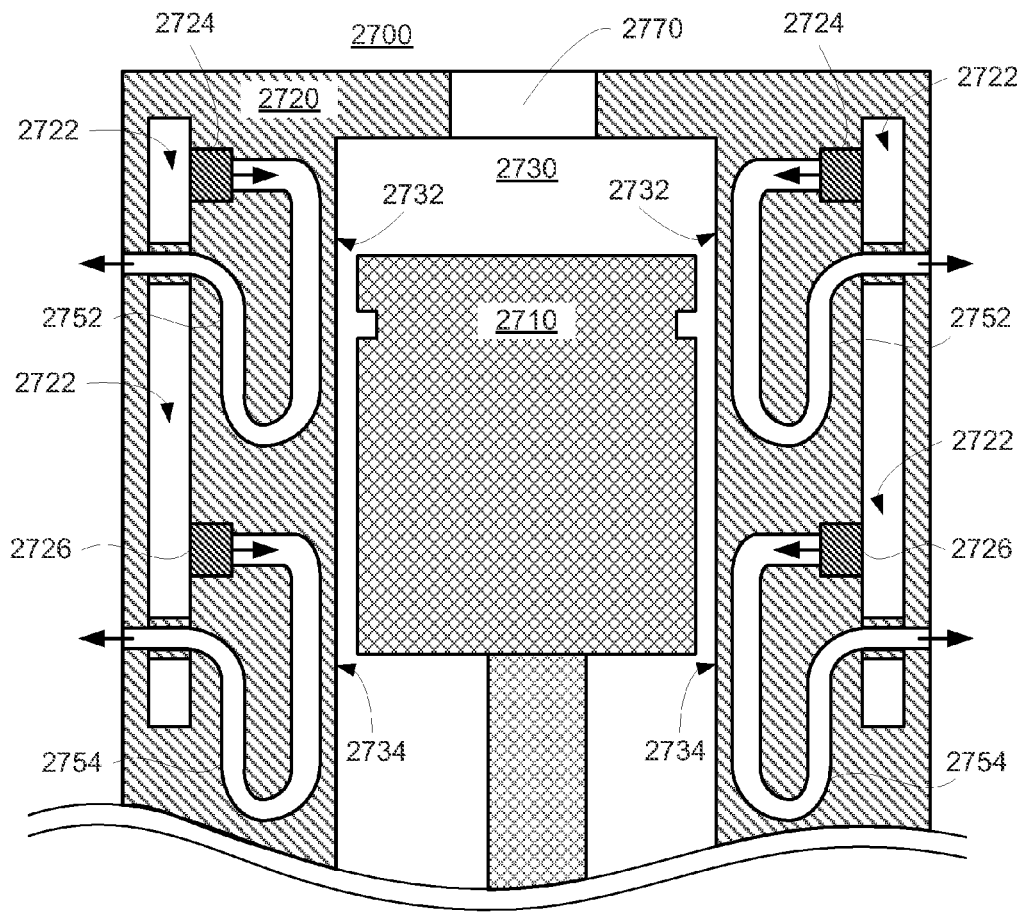
FIG. 27 shows a cross-section view of a portion of an illustrative piston engine, with localized coolant passages, in accordance with some embodiments of the present disclosure.

FIG. 27 shows a cross-section view (normal to the bore axis) of a portion of an illustrative piston engine 2700, with localized coolant passages 2752 and 2754, in accordance with some embodiments of the present disclosure. Cylinder 2720 of piston engine 2700 may include one or more plenums 2722, which may be coupled to one or more throttles 2724 and one or more throttles 2726. In some embodiments, a throttled fluid may flow from one or more plenums 2722 through one or more throttles 2724 into coolant passages 2752, configured to cool region 2732 (e.g., as shown by the illustrative arrows in coolant passages 2752). In some embodiments, a throttled fluid may flow from one or more plenums 2722 through one or more throttles 2726 into coolant passages 2754, configured to cool region 2734 (e.g., as shown by the illustrative arrows in coolant passages 2754). One or more throttles 2724 and 2726 may each include a fixed flow restricting orifice, an adjustable flow restricting orifice, a controllable throttling valve, any other suitable fluid throttling feature, or any combination thereof. The one or more throttles 2724 and 2726 may cause a reduction in the pressure of the throttled fluid, which may also result in a reduction in temperature and/or enthalpy of the throttled fluid. The reduced fluid temperature and/or enthalpy may enhance heat transfer from a bore of cylinder 2720 (e.g., the illustrated bore configured to house piston assembly 2710). In some embodiments, coolant passages 2752 and 2754 may include tubular conduits, manifolds, or other flow directing components to provide a flow of throttled fluid from one or more throttles 2724 and 2726 to a localized spatial region of cylinder 2720, and then return the fluid to a fluid control system (e.g., which may include a return line and a reservoir). Piston engine 2700 may include any suitable number of plenums 2722, which may be, but need not be, interconnected. For example, plenums 2722 may include multiple plenums, each separately controllable to provide selectable cooling to localized spatial regions of cylinder 2720. In a further example, plenums 2722 may include a single plenum, which may be coupled to multiple throttles to provide selectable cooling to localized spatial regions of cylinder 2720. The multiple throttles may be separately controllable, or otherwise have unique flow restricting properties to control cooling of one or more localized spatial regions of cylinder 2720. In some embodiments, cooling of cylinder 2720 using a throttled fluid may allow control of a cylinder temperature, and a clearance gap between cylinder 2720 and piston assembly 2710. In some embodiments, direct or indirect measurement of bore geometry (e.g., size, shape or both) may be used to by a control system to control cooling by localized coolant passages 2752 and 2754. For example, higher operating temperatures may be expected near combustion section 2730, near TDC, and increased cooling may be provided to region 2732 to limit the temperature field. In a further example, in some circumstances, decreased cooling may be provided to region 2732 to increase the corresponding bore and associated clearance gap. Increases or decreases in cooling may be provided by increasing or decreasing the throttling action of a throttle, adjusting a throttled fluid's temperature, adjusting a throttled fluid's flow rate, any other suitable adjustment, or any combination thereof. The throttled fluid may include any suitable coolant fluid, which may be a liquid or a gas. For example, the throttled fluid may include ethylene glycol, propylene glycol, water, alcohol, air, any other suitable fluid, or any combination thereof (e.g., ethylene glycol diluted with water). Cylinder 2720 may include any suitable ports 2770 for supplying or removing fluid (e.g., air, fuel, exhaust, or combinations thereof) from suitable sections of piston engine 2700.

Figure 28:
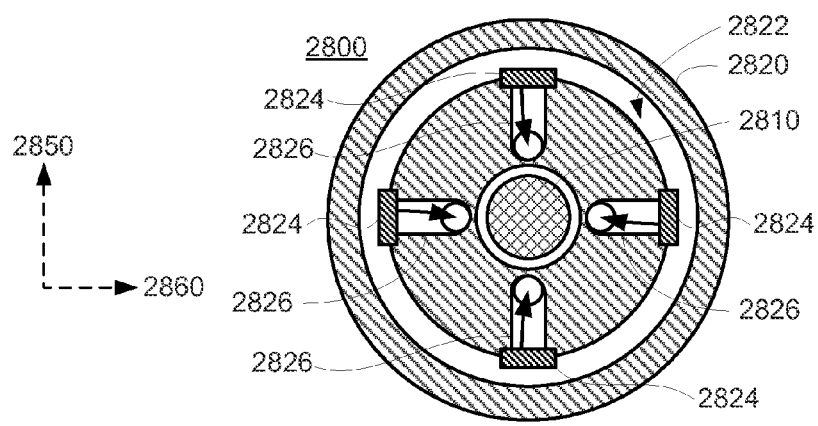
FIG. 28 shows a cross-section view of a portion of an illustrative piston engine, with localized coolant passages, in accordance with some embodiments of the present disclosure.

FIG. 28 shows a cross-section view (parallel to the bore axis) of a portion of an illustrative piston engine 2800, with localized coolant passages 2826, in accordance with some embodiments of the present disclosure. Piston engine 2800 may include cylinder 2820 having a plenum 2822. Cylinder 2820 may include a bore configured to house piston assembly 2810, configured to move substantially linearly, in a direction substantially parallel to the vector cross-product of vectors 2850 and 2860. Although shown as an annular plenum in FIG. 28, plenum 2822 may include any suitable conduit shape, arranged to provide any suitable flow path. A coolant may flow through throttles 2824, into localized coolant passages 2826 to cool corresponding spatial regions of cylinder 2820. In the illustrated embodiment, the coolant flows radially inward from throttles 2824 (as shown by the four arrows pointing radially inward in figure FIG. 28) and then flows in a direction given by the vector cross-product of vector 2850 with vector 2860 (2850×2860 which is into the plane of FIG. 28). The return flow path of the coolant is not shown in FIG. 28, and may include radial, axial, or both, flow paths. In some embodiments, throttles 2824 may create fluid jets in localized fluid passages 2826, which may impinge on a spatial region of cylinder 2820 resulting in relatively increased convective heat transfer at that region. Although shown as having four, symmetric localized coolant passages 2826 in FIG. 28, piston engine 2800 may include any suitable number of localized coolant passages, arranged in any suitable symmetric or asymmetric configuration, at any suitable axial locations, and coupled to any suitable number of plenums or other coolant sources.

Figure 29:
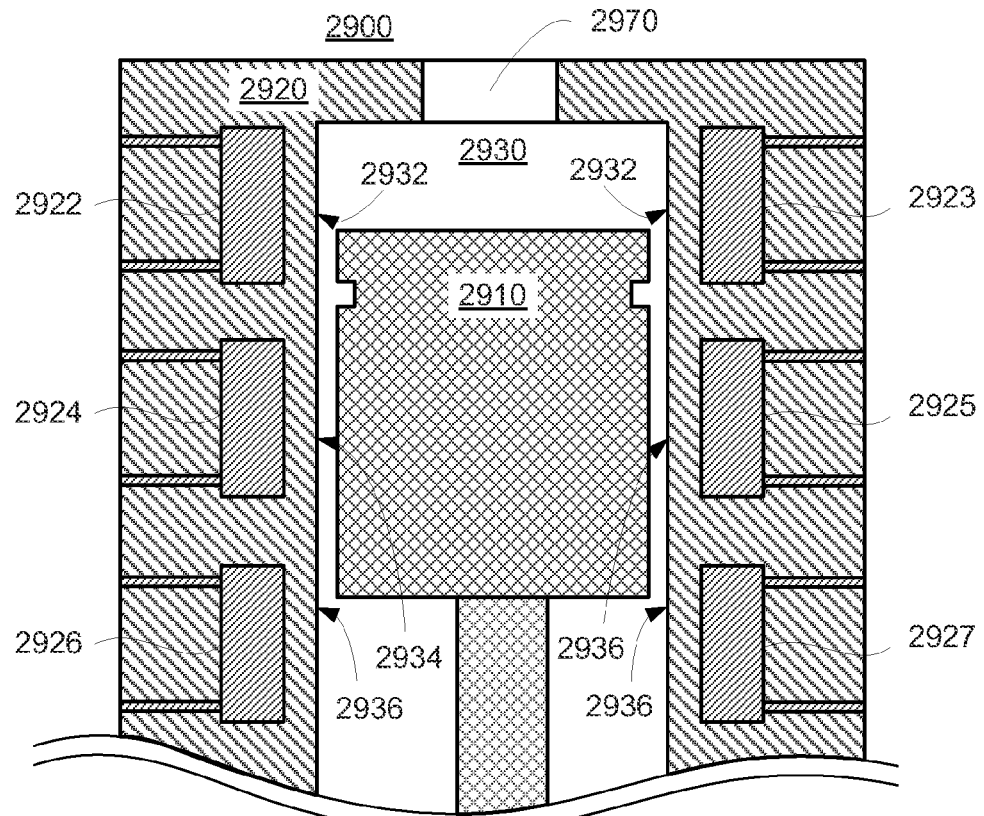
FIG. 29 shows a cross-section view of a portion of an illustrative piston engine, with localized heat sources including electric heaters, in accordance with some embodiments of the present disclosure.

FIG. 29 shows a cross-section view of a portion of an illustrative piston engine 2900, with localized heat sources including electric heaters 2922, 2923, 2924, 2925, 2926, and 2927, in accordance with some embodiments of the present disclosure. Each of electric heaters 2922, 2923, 2924, 2925, 2926, and 2927 may include one or more electric leads used by a suitable control system to control a voltage, current, electric power, or combinations thereof, supplied to the heaters. For example, electric heaters 2922 and 2923 may be used separately or in concert to provide heating to region 2932 near combustion section 2930 (e.g., to increase a clearance gap between cylinder 2920 and piston assembly 2910). In a further example, electric heaters 2924, 2925, 2926, and 2927 may be used to heat corresponding regions 2934 and 2936. Localized heat sources, such as electric heaters, may be used to provide relatively fast thermal control of one or more spatial regions of a cylinder. In some embodiments, direct or indirect measurement of bore geometry (e.g., size, shape or both) may be used to by a control system to control localized heat sources. For example, each of electric heaters 2922, 2923, 2924, 2925, 2926, and 2927 may be separately controllable by a control system, in response to a detected temperature, pressure, clearance gap, blow-by property, work interaction, any other suitable indicator, or any combination thereof. Cylinder 2920 may include any suitable ports 2970 for supplying or removing fluid (e.g., air, fuel, exhaust, or combinations thereof) from suitable sections of piston engine 2900.

Figure 30:
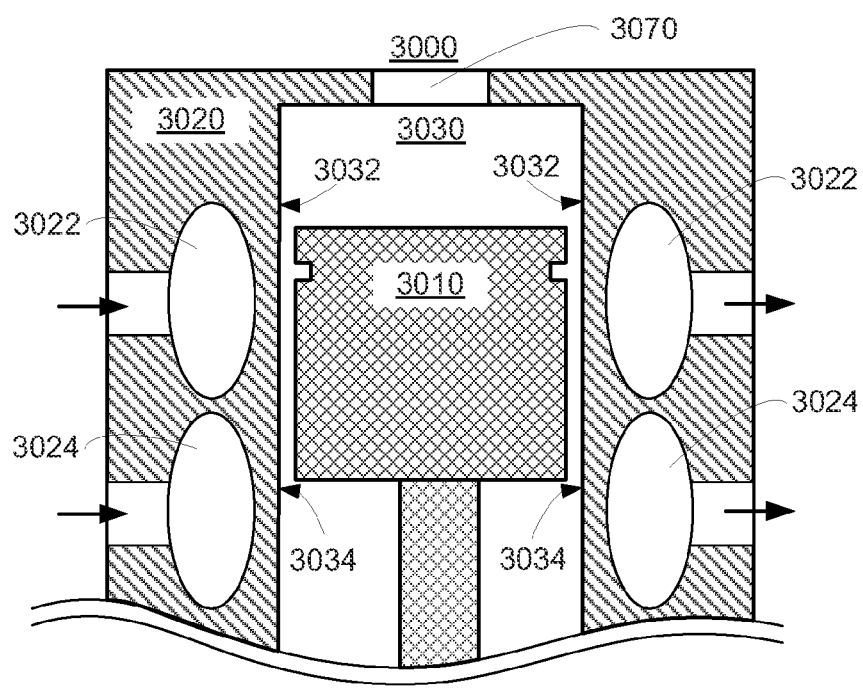
FIG. 30 shows a cross-section view of a portion of an illustrative piston engine, including fluid passages, which may be used for heating, cooling, or both, in accordance with some embodiments of the present disclosure.

FIG. 30 shows a cross-section view of a portion of an illustrative piston engine 3000, including fluid passages 3022 and 3024, which may be used for heating, cooling, or both, in accordance with some embodiments of the present disclosure. In some embodiments, a heating fluid, cooling fluid, or both, may be supplied to fluid passages 3022 and 3024, which may be, but need not be, interconnected. For example, fluid may be supplied to and removed from fluid passages 3022 and 3024 as shown by the four arrows in FIG. 30 (e.g., for annular fluid passages having supply and return ports). In some embodiments, fluid passages 3022 and 3024 may be localized heating sources. For example, fluid passages 3022 and 3024 may be separately controllable to provide heating to respective regions 3032 and 3034. Fluid passages 3022 or 3024 may provide heating by acting as a conduit for a heating fluid, which may include, for example, previously heated coolant, exhaust fluid (e.g., hot combustion products from a combustion section), any other suitable heating fluid, or any combination thereof. In some embodiments, fluid passages 3022 and 3024 may be used for both heating and cooling of spatial regions of cylinder 3020. For example, a heating fluid may be supplied to fluid passages 3022 to increase a temperature of region 3032 (e.g., to increase a bore diameter and clearance gap), while a cooling fluid may be supplied to fluid passages 3024 to decrease a temperature of region 3034 (e.g., to decrease a bore diameter and clearance gap). In a further example, a heating fluid or coolant may be supplied to fluid passages 3022 depending on a determination of a control system. Cylinder 3020 may include any suitable ports 3070 for supplying or removing fluid (e.g., air, fuel, exhaust, or combinations thereof) from suitable sections of piston engine 3000.

In some embodiments, a cylinder may be configured to undergo a thermal deformation corresponding to a controlled temperature, or change thereof, of the cylinder, such as, for example, those described in the context of FIGS. 22 and 27-30. A controlled temperature, or change thereof, may correspond to a localized spatial region of the cylinder. The use of a coolant, a heating fluid, a throttled fluid, an electric resistance heater, any other suitable component or feature for controlling temperature, or any combination thereof may allow a control system to control one or more properties of a piston engine such as, for example, a clearance gap.

Combination of Approaches

In some embodiments, two or more of the foregoing approaches may be combined. Self-centering features, fluid bearings, heat pipes, coolant passages, deformable cylinder liners, and any other suitable component or feature, may be suitably combined in implementing a piston engine, in accordance with the present disclosure.

For example, FIG. 31 shows a perspective view of a portion of an illustrative piston assembly 3100 having seal 3104, fluid bearing element 3108, and a self-centering feature 3106, in accordance with some embodiments of the present disclosure. Piston assembly 3100 may include piston face 3102, seal 3104, self-centering feature 3106, fluid bearing element 3108, any other suitable components (not shown), or any combination thereof. In some embodiments (as shown), self-centering feature 3106 may be a part of seal 3104. For example, seal 3104 may include self-centering feature 3106, which may be a machined step or other suitable feature in the bearing element. In some embodiments (not shown), self-centering feature 3106 may be a part of piston face 3102. For example, self-centering feature 3106 may be a step, one or more slotted pockets, a tapered portion, or other feature included in piston assembly 3100. Gas supplied from any suitable fluid source, may be distributed within piston assembly 3100 via internal fluid passages (not shown), and then may flow through any suitable portion of fluid bearing element 3108 (shown as porous in FIG. 31, but any suitable bearing element may be used).

In a further example, FIG. 32 shows a cross-section view of an illustrative piston engine 3200 with a piston assembly 3210 having a bearing element 3214, a heat pipe 3250, and a self-centering feature 3212, and a cylinder 3230 having a deformable cylinder liner 3232 and coolant passages 3236, in accordance with some embodiments of the present disclosure. Piston assembly 3210 may be configured to translate in the bore created by deformable cylinder liner 3232, with clearance gap 3260. Application of a liner fluid, controlled to a suitable pressure, may be supplied to passage 3234, via port 3233, to adjust clearance gap 3260. Bearing fluid may be supplied to passages 3218, and flow out of bearing element 3214 into clearance gap 3260 to aid in centering piston assembly 3210 in the bore. Self-centering feature 3212 may aid in centering piston assembly 3210 in the bore. A suitable coolant may be supplied to coolant passages 3236 in cylinder 3230 to remove heat from cylinder 3230 or portions thereof. Heat pipe 3250, having fill port 3282, may aid in transferring heat away from piston face 3202 to another portion of piston assembly 3210. Ports 3270 may be used to supply oxidizer and/or fuel, supply and/or remove driver gas, or remove exhaust from a section of the cylinder.

In some embodiments, a combination of one or more approaches may require one or more additional considerations. For example, in some embodiments, a piston assembly may include a self-centering feature configured to provide a self-centering force using blow-by gas, and a bearing element configured to provide a bearing fluid to a clearance gap. The self-centering feature thus may require some blow-by gas to flow along the clearance gap to provide the self-centering force. Under some conditions, flow of blow-by gas in the clearance gap may affect the performance of the bearing element by altering the flow pattern of the bearing fluid in the clearance gap. Accordingly, in some embodiments having a bearing element behind the self-centering feature (relative to the combustion section), blow-by gas may be routed away from the clearance gap after traversing the portion of the clearance gap adjacent to the self-centering feature, but before entering the portion of the clearance gap adjacent to the bearing element. Further, in some arrangements, a bearing element may include a self-centering feature, and a collection of holes for directing bearing fluid that may extend to the piston face. Accordingly, in some such embodiments, no routing of the blow-by gas away from the clearance gap need be used. The previous examples may optionally be applied to a gas driver section in addition to or instead of a combustion section.

Control of Clearance Gap and/or Other Properties

In some embodiments, one or more aspects of the operation of a piston engine may be controlled or otherwise managed to affect a temperature, clearance gap, any other suitable property of the piston engine, or any combination thereof. In some embodiments, controlling a temperature, pressure, or other suitable property of a piston engine may aid in managing a clearance gap of the piston engine. For example, relatively large temperature differences may cause deformation such as expansion of some components of a piston engine, which may affect a clearance gap. Controlling temperature differences and/or temperature fields may aid in reducing deformation, and accordingly may aid in managing the clearance gap. Managing a clearance gap may include managing any other suitable property that may affect a clearance gap.

Figure 33:
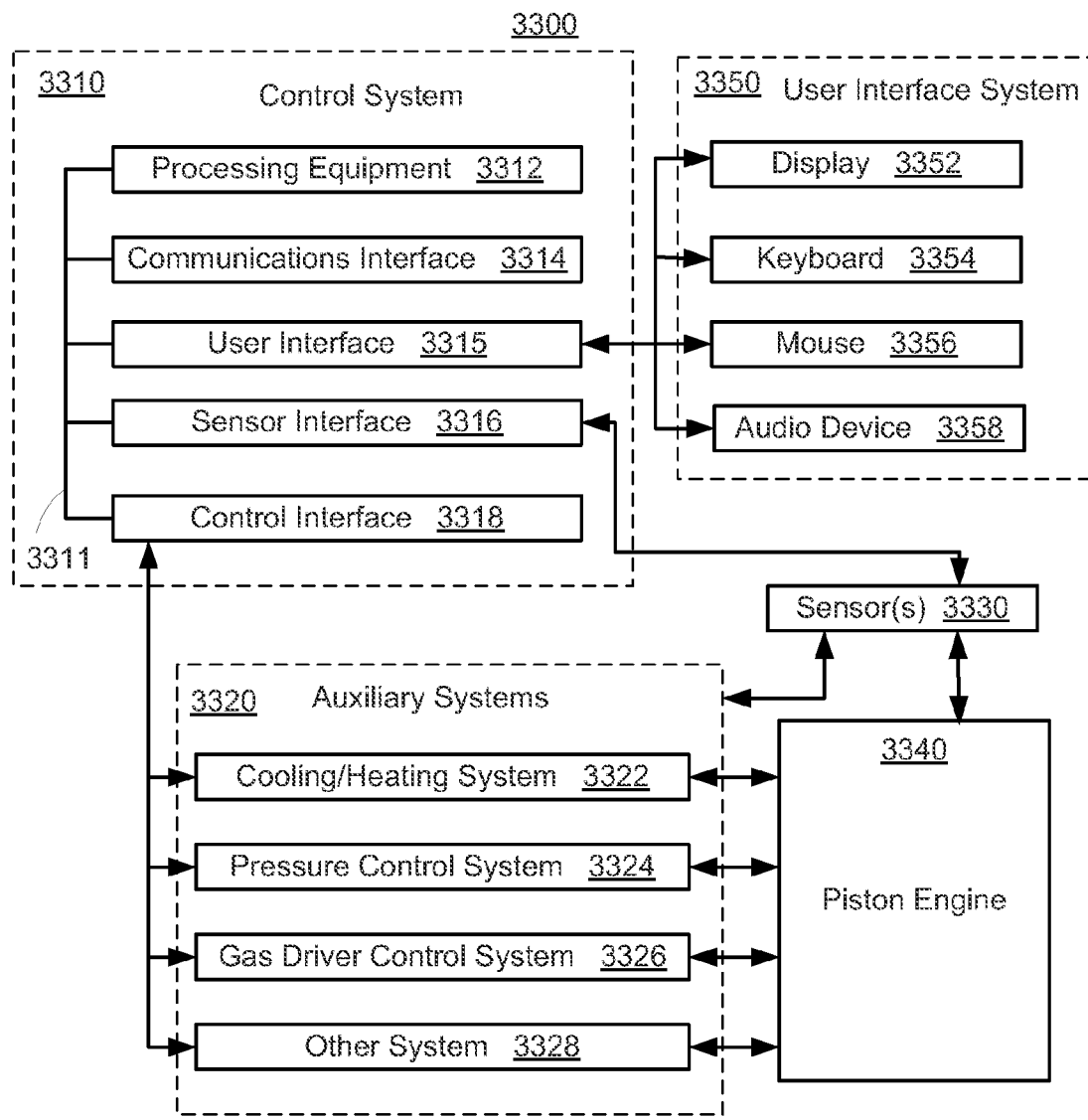
FIG. 33 is a block diagram of an illustrative control arrangement for a piston engine, in accordance with some embodiments of the present disclosure.

FIG. 33 is a block diagram of an illustrative control arrangement 3300 for a piston engine 3340, in accordance with some embodiments of the present disclosure. A control system 3310 may communicate with one or more sensors 3330 coupled to piston engine 3340. Control system 3310 may be configured to communicate with auxiliary systems 3320, which may be used to adjust aspects or properties of piston engine 3340. In some embodiments, control system 3310 may be configured to interact with a user via user interface system 3350.

Control system 3310 may include processing equipment 3312, communications interface 3314, sensor interface 3316, control interface 3318, any other suitable components or modules, or any combination thereof. Control system 3310 may be implemented at least partially in one or more computers, terminals, control stations, handheld devices, modules, any other suitable interface devices, or any combination thereof. In some embodiments, the components of control system 3310 may be communicatively coupled via a communications bus 3311, as shown in FIG. 33. Processing equipment 3312 may include a processor (e.g., a central processing unit), cache, random access memory (RAM), read only memory (ROM), any other suitable components, or any combination thereof that may process information regarding piston engine 3340, as received by sensor interface 3316 from sensor(s) 3330. Sensor interface 3316 may include a power supply for supplying power to sensor(s) 3330, a signal conditioner, a signal pre-processor, any other suitable components, or any combination thereof. For example, sensor interface 3316 may include a filter, an amplifier, a sampler, and an analog to digital converter for conditioning and pre-processing signals from sensor(s) 3330. Sensor interface 3316 may communicate with sensor(s) 3330 via communicative coupling 3319, which may be a wired connection (e.g., using IEEE 802.3 ethernet, or universal serial bus interface), wireless coupling (e.g., using IEEE 802.11 "Wi-Fi", or Bluetooth), optical coupling, inductive coupling, any other suitable coupling, or any combination thereof. Control system 3310, and more particularly processing equipment 3312, may be configured to provide control of piston engine 3340 over relevant time scales. For example, a change in one or more temperatures may be controllable in response to one or more detected engine operating parameters, and the control may be provided on a time scale relevant to operation of the piston engine (e.g., fast enough response to prevent overheating and/or component failure).

Sensor(s) 3330 may include any suitable type of sensor, which may be configured to sense any suitable property or aspect of piston engine 3340. In some embodiments, sensor(s) may include one or more sensors configured to sense an aspect and/or property of a system of auxiliary systems 3320. In some embodiments, sensor(s) 3330 may include a temperature sensor (e.g., a thermocouple, resistance temperature detector, thermistor, or optical temperature sensor) configured to sense the temperature of a component of piston engine 3340, a fluid introduced to or recovered from piston engine 3340, or both. In some embodiments, sensor(s) 3330 may include one or more pressure sensors (e.g., piezoelectric pressure transducers) configured to sense a pressure within a section of piston engine 3340 (e.g., a combustion section, or gas driver section), of a fluid introduced to or recovered from piston engine 3340, or both. In some embodiments, sensor(s) 3330 may include one or more force sensors (e.g., piezoelectric force transducers) configured to sense a force within piston engine 3340 such as a tensile, compressive or shear force (e.g., which may indicate a friction force or other relevant force information). In some embodiments, sensor(s) 3330 may include one or more current and/or voltage sensors (e.g., an ammeter and/or voltmeter coupled to a LEM of piston engine 3340) configured to sense a voltage, current, work output and/or input (e.g., current multiplied by voltage), any other suitable electrical property of piston engine 3340 and/or auxiliary systems 3320, or any combination thereof.

Control interface 3318 may include a wired connection (e.g., using IEEE 802.3 ethernet, or universal serial bus interface), wireless coupling (e.g., using IEEE 802.11 "Wi-Fi", Bluetooth, or other RF communication protocol), optical coupling, inductive coupling, any other suitable coupling, or any combination thereof, for communicating with one or more of auxiliary systems 3320. In some embodiments, control interface 3318 may include a digital to analog converter to provide an analog control signal to any or all of auxiliary systems 3320.

Auxiliary systems 3320 may include a cooling system 3322, a pressure control system 3324, a gas driver control system 3326, and/or any other suitable control system 3328. Cooling/heating system 3322 may include a pump, fluid reservoir, pressure regulator, bypass, radiator, fluid conduits, electric power circuitry (e.g., for electric heaters), any other suitable components, or any combination thereof to provide cooling, heating, or both to piston engine 3340. Pressure control system 3324 may include a pump, compressor, fluid reservoir, pressure regulator, fluid conduits, any other suitable components, or any combination thereof to supply (and optionally receive) a pressure controlled fluid to piston engine 3340. Gas driver control system 3326 may include a compressor, gas reservoir, pressure regulator, fluid conduits, any other suitable components, or any combination thereof to supply (and optionally receive) a driver gas to piston engine 3340. In some embodiments, other system 3328 may include a valving system such as, for example, a cam-operated system or a solenoid system to supply oxidizer and/or fuel to piston engine 3340.

User interface 3315 may include a wired connection (e.g., using IEEE 802.3 ethernet, or universal serial bus interface, tip-ring-seal RCA type connection), wireless coupling (e.g., using IEEE 802.11 "Wi-Fi", Infrared, or Bluetooth), optical coupling, inductive coupling, any other suitable coupling, or any combination thereof, for communicating with one or more of user interface systems 3350. User interface systems 3350 may include display 3352, keyboard 3354, mouse 3356, audio device 3358, any other suitable user interface devices, or any combination thereof. Display 3352 may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. In some embodiments, display 3352 may include a touchscreen, which may provide tactile interaction with a user by, for example, offering one or more soft commands on a display screen. Display 3352 may display any suitable information regarding piston engine 3340 (e.g., a time series of a property of piston engine 3340), control system 3310, auxiliary systems 3320, user interface system 3350, any other suitable information, or any combination thereof. Keyboard 3354 may include a QWERTY keyboard, a numeric keypad, any other suitable collection of hard command buttons, or any combination thereof. Mouse 3356 may include any suitable pointing device that may control a cursor or icon on a graphical user interface displayed on a display screen. Mouse 3356 may include a handheld device (e.g., capable of moving in two or three dimensions), a touchpad, any other suitable pointing device, or any combination thereof. Audio device 3358 may include a microphone, a speaker, headphones, any other suitable device for providing and/or receiving audio signals, or any combination thereof. For example, audio device 3358 may include a microphone, and processing equipment 3312 may process audio commands received via user interface 3315 caused by a user speaking into the microphone.

In some embodiments, control system 3310 may be configured to provide manual control, by receiving one or more user inputs. For example, in some embodiments, control system 3310 may override automatic control setting based on sensor feedback, and base a control signal to auxiliary system 3320 on one or more user inputs to user interface system 3350. In a further example, a user may input a set-point value for one or more control variables (e.g., temperatures, pressures, flow rates, work inputs/outputs, or other variables) and control system 3310 may execute a control algorithm based on the set-point value.

In some embodiments, operating characteristics (i.e., a collection of desired property values of piston engine 3340 or auxiliary systems 3320) may be pre-defined by a manufacturer, user, or both. For example, particular operating characteristics may be stored in memory of processing equipment 3312, and may be accessed to provide one or more control signals. In some embodiments, one or more of the operating characteristics may be changed by a user. Arrangement 3300 may be used to maintain, adjust, or otherwise manage those operating characteristics.

Figure 34:
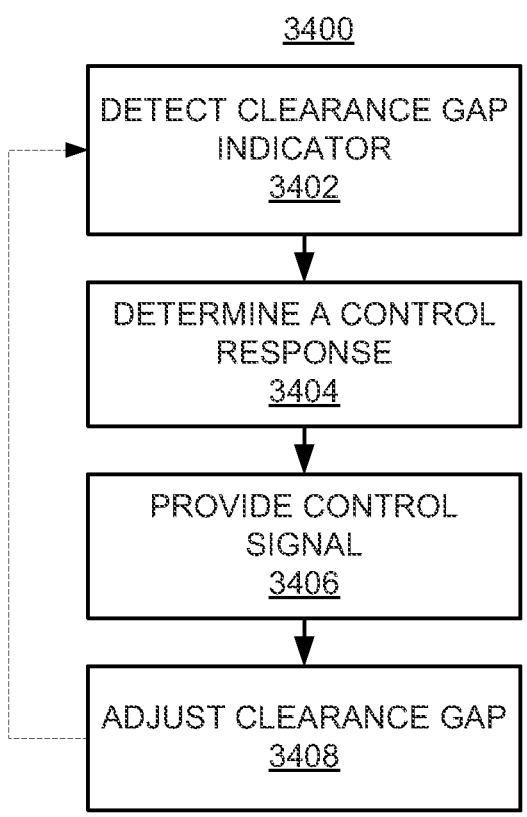
FIG. 34 is a flow diagram of illustrative steps for adjusting a clearance gap of a piston engine, in accordance with some embodiments of the present disclosure.

FIG. 34 is a flow diagram 3400 of illustrative steps for adjusting a clearance gap of a piston engine, in accordance with some embodiments of the present disclosure.

Step 3402 may include detecting a clearance gap indicator using sensor(s) 3330. The clearance gap indicator may be a temperature (e.g., of a coolant, hating fluid, cylinder, piston, or other component, or portion thereof), pressure, force, distance (e.g., a clearance gap), work interaction (e.g., electromagnetic work output), material (e.g., blow-by or property thereof) any other suitable detectable property, or any combination thereof. Sensor interface 3316 may receive, condition, and/or pre-process the clearance gap indicator from sensor(s) 3330, and output a sensor signal to processing equipment 3312. In some embodiments, a clearance gap indicator may be stored and correlated to one or more operating conditions of a piston engine. For example, cylinder temperature may be correlated with fuel flow, and stored as a mathematical expression or table. Accordingly, step 3402 may include detecting the one or more operating conditions of the piston engine, and recalling a stored cylinder temperature value, which may be used for further processing.

Step 3404 may include processing equipment 3312 determining a control response based at least in part on the detected clearance gap indicator of step 3402. Processing equipment 3312 may receive the sensor signal from sensor interface 3316, and perform one or more processing functions on the sensor signal. Processing functions may include inputting the sensor signal values in an equation or other mathematical expression, using the sensor signal values in a look-up table or other database, any other suitable processing, or any combination thereof. Processing equipment 3312 may determine a control response based on output of the one or more processing functions. For example, a calculated value may be compared to a pre-defined threshold to determine a suitable control response. In a further example, one or more calculated values may inputted into a control algorithm (e.g., a proportional-integral-derivative (PID) control algorithm), and one or more control signal values may be determined.

Step 3406 may include processing equipment 3312 providing a control signal, based at least in part on the determined control response of step 3404, to one or more of auxiliary systems 3320, using control interface 3318. The control signal may be an analog signal, a digital signal, or a combination thereof (e.g., an analog signal with a digital timing signal), which may be provided as an electrical signal (e.g., using wired cables), an electromagnetic signal (e.g., using IEEE 802.11 "Wi-Fi", or Bluetooth receivers/transmitters), an optical signal (e.g., using fiber optic cables), inductive signal (e.g., using suitable conductive coils), or other suitable signal type.

Step 3408 may include the one or more of auxiliary systems 3320 that received a control signal at step 3406 adjusting a clearance gap, or other property, of piston engine 3340. The one or more of auxiliary systems 3320 may adjust a pressure, temperature, flow rate, flow route, current, voltage, electric power, make any other suitable adjustment, or any combination thereof based on the provided control signal. As shown by the dotted arrow in FIG. 34, any or all of steps 3402-3408 may be repeated to allow closed-loop control. In some embodiments, an open-loop approach may be used, in which step 3402 may be (but need not be) omitted, and steps 3404-3408 are performed without looping.

In some arrangements, the temperature field of a cylinder and/or piston assembly, or fluid contained therein, of a piston engine may be a primary and convenient indicator of a clearance gap, and the temperature field may accordingly be actively adjusted to adjust the clearance gap. In an illustrative example, step 3402 may include detecting a temperature such as, for example, a cylinder temperature or a coolant temperature (e.g., of coolant provided to coolant passages of a cylinder of a piston engine). Step 3404 may include determining how to adjust the temperature field to maintain or otherwise manage the clearance gap, while step 3406 may include providing the corresponding control signal to the appropriate auxiliary system. For example, a cylinder temperature may be increased by reducing a coolant flow rate, which may increase a clearance gap via thermal expansion. In a further example, a cylinder temperature may be decreased by increasing a coolant flow rate, which may decrease a clearance gap via thermal contraction. In a further example, the flow of coolant or a heating fluid in more than one set of fluid passages may be adjusted to control the temperature field of zones of a cylinder (e.g., see FIG. 22). In reference to the previous examples, a coolant or heating fluid flow may be adjusted by adjusting, for example, a flow control valve, a pump rotation speed, a bypass flow control valve, a pressure regulator, any other suitable control device for controlling a flow rate, or any combination thereof, based on the control signal of step 3406. In a further illustrative example, step 3402 may include detecting a temperature such as, for example, a temperature of a heat pipe (e.g., the temperature of a heat pipe or heat pipe fluid therein) within a cylinder of a piston engine. Step 3404 may include determining how to adjust the temperature field to maintain or otherwise manage the clearance gap, while step 3406 may include providing the corresponding control signal to the appropriate auxiliary system. For example, a heat pipe temperature may be increased by increasing the pressure of the fluid within the heat pipe (e.g., by adding fluid to the heat pipe, or reducing the volume of the heat pipe), which may increase a clearance gap. In a further example, a heat pipe temperature may be decreased by decreasing a heat pipe pressure (e.g., by removing fluid from the heat pipe, or increasing the volume of the heat pipe), which may decrease a clearance gap. In reference to the previous example, properties of a fluid within a heat pipe (e.g., having a fluid port, or other adjustable feature) may be adjusted by adjusting, for example, a flow control valve, a pressure regulator, a check valve, any other suitable control device for controlling a heat pipe pressure and suitable fluid port included in the heat pipe, or any combination thereof, based on the control signal of step 3406.

Figure 35:
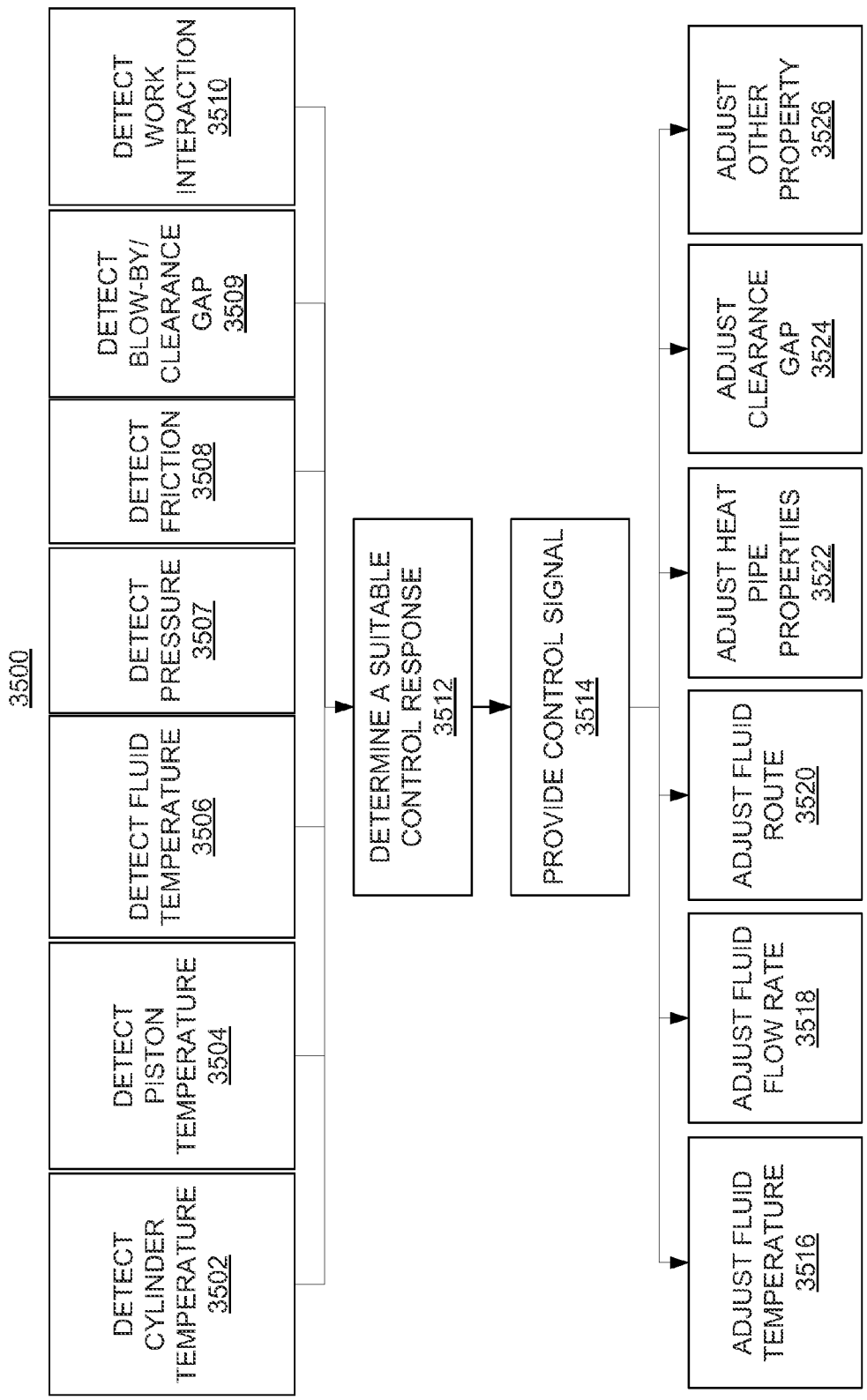
FIG. 35 is a flow diagram of illustrative steps for adjusting one or more properties of a piston engine, in accordance with some embodiments of the present disclosure.

FIG. 35 is a flow diagram 3500 of illustrative steps for adjusting one or more properties of a piston engine, in accordance with some embodiments of the present disclosure.

In some embodiments, a clearance gap indicator may be detected using sensor(s) 3330. Sensor interface 3316 may receive a raw signal from sensor(s) 3330 and provide a sensor signal to processing equipment 3312. For example, step 3502 may include detecting a cylinder temperature of piston engine 3340 using a temperature sensor such as a thermocouple positioned in contact with or near a portion of the cylinder (e.g., near a combustion section). In some circumstances, increased cylinder temperatures may indicate insufficient cooling which may affect a clearance gap. In a further example, step 3504 may include detecting a piston temperature of piston engine 3340 using a temperature sensor such as a thermocouple positioned in contact with or near a portion of a piston assembly (e.g., near a piston face). In some circumstances, increased piston temperatures may indicate insufficient cooling which may affect a clearance gap. In a further example, step 3506 may include detecting a fluid (e.g., a coolant, a heating fluid, or exhaust, which may supplied to or recovered from piston engine 3340) temperature of piston engine 3340 using a temperature sensor such as a thermocouple positioned in contact with or near the fluid (e.g., inserted in a fluid conduit using a suitable measurement port). For example, in some circumstances, increased coolant temperatures may indicate insufficient cooling which may affect a clearance gap. In a further example, step 3507 may include detecting a pressure of a combustion section, a gas driver section, a clearance gap, a coolant, a heating fluid, any other fluid of piston engine 3340, or any combination thereof using a pressure sensor such as a piezoelectric transducer positioned in contact with or near the coolant (e.g., inserted in a conduit using a suitable measurement port). In a further example, step 3508 may include detecting friction between components of piston engine 3340 using a force sensor such as a piezoelectric transducer and/or a temperature sensor such as a thermocouple positioned in contact with or near the interface of the components. In some circumstances, an increased effect of friction (e.g., a friction force, or friction-generated heat) may indicate an insufficient clearance gap. In a further example, step 3509 may include detecting one or more properties of a clearance gap of piston engine 3340. The one or more properties may include a thickness of the clearance gap (e.g., using a proximity sensor such as an induction sensor), asymmetry of the clearance gap (e.g., using multiple proximity sensors such as an induction sensors), blow-by temperature (e.g., using a temperature sensor), blow-by pressure (e.g., using a pressure sensor), blow-by composition (e.g., using a gas sensor such as an optical absorption sensor), and other suitable property, or any combination thereof. In a further example, step 3510 may include detecting a work interaction of piston engine 3340 using an electromagnetic sensor (e.g., a voltmeter, ammeter, or power meter), a pressure transducer (e.g., to detect pressure for calculating a mean effective pressure (MEP) such as indicated MEP, brake MEP, and/or friction MEP), or other suitable sensor, to provide an indication of a clearance gap. In some circumstances, a reduced work output, or increased work input requirements may indicate an insufficient and/or excessive clearance gap.

Step 3512 may include processing equipment 3312 determining a control response based at least in part on any or all of the detected clearance gap indicators of steps 3502, 3504, 3506, 3508, and 3510. Processing equipment 3312 may receive the sensor signal from sensor interface 3316, and perform one or more processing functions on the sensor signal. Processing functions may include inputting the sensor signal values in an equation or other mathematical expression, using the sensor signal values in a look-up table or other database, any other suitable processing, or any combination thereof. Processing equipment 3312 may determine a control response based on output of the one or more processing functions. For example, a calculated value may be compared to a pre-defined threshold to determine a suitable control response. In a further example, one or more calculated values may inputted into a control algorithm (e.g., a PID control algorithm), and one or more control signal values may be determined.

Step 3514 may include processing equipment 3312 providing a control signal, based at least in part on the determined control response of step 3512, to one or more of auxiliary systems 3320, using control interface 3318. The control signal may be an analog signal, a digital signal, or a combination thereof (e.g., an analog signal with a digital timing signal), which may be provided as an electrical signal (e.g., using wired cables), an electromagnetic signal (e.g., using IEEE 802.11 "Wi-Fi", or Bluetooth receivers/transmitters), an optical signal (e.g., using fiber optic cables), inductive signal (e.g., using suitable conductive coils), or other suitable signal type.

In some embodiments, the control signal of step 3514 may be received by one or more of auxiliary systems 3320, which may adjust a clearance gap, or other property, of piston engine 3340. For example, as shown by step 3516, the control signal of step 3514 may be received by cooling/heating system 3322, which may adjust a temperature of a coolant or heating fluid. Cooling/heating system 3322 may include a thermostat or other temperature regulating device, which may adjust a coolant or heating fluid temperature provided to piston engine 3340 at step 3516 according to the control signal. In a further example, step 3516 may include cooling/heating system 3322 adjusting one or more throttle properties to control a temperature of a throttled fluid. In a further example, as shown by step 3518, the control signal of step 3514 may be received by cooling/heating system 3322, which may adjust a flow rate of a coolant or heating fluid. Cooling/heating system 3322 may include a flow regulator (e.g., a metering valve or orifice), which may adjust a flow rate of coolant or heating fluid provided to piston engine 3340 at step 3518 according to the control signal. In a further example, step 3518 may include cooling/heating system 3322 adjusting one or more throttle properties to control a flow rate of a throttled fluid. In a further example, as shown by step 3520, the control signal of step 3514 may be received by cooling/heating system 3322, which may adjust a flow route of a coolant or heating fluid at step 3520. Cooling/heating system 3322 may include one or more valves, throttles, or other flow control devices which may direct and control a flow rate of coolant or heating fluid provided to piston engine 3340 to and/or from one or more fluid passages, according to the control signal. In a further example, as shown by step 3522, the control signal of step 3514 may be received by pressure control system 3324, which may adjust one or more properties of a heat pipe at step 3522. Pressure control system 3324 may include one or more valves and a fluid reservoir, and may adjust the pressure of fluid within a heat pipe of piston engine 3340 (e.g., by supplying or removing fluid from the heat pipe), according to the control signal. In a further example, as shown by step 3524, the control signal of step 3514 may be received by pressure control system 3324, which may adjust the pressure and/or flow of a liner fluid to a deformable cylinder liner of piston engine 3340. Pressure control system 3324 may include one or more valves, pumps, and a fluid reservoir, and may adjust the pressure and/or flow rate of liner fluid, and accordingly the deformation of the deformable cylinder liner of piston engine 3340 (e.g., by increasing or decreasing pressure in the liner passages) at step 3524, according to the control signal. In a further example, as shown by step 3526, the control signal of step 3514 may be received by other system 3328, which may adjust one or more properties of piston engine 3340. Other system 3328 may include any suitable components to achieve the adjustment of the one or more properties of piston engine 3340 at step 3526, based at least in part on the control signal. For example, other system 3328 may include power electronics configured to provide electric power to one or more electric resistance heaters embedded in piston engine 3340, and step 3526 may include adjusting voltage, current, or both supplied to the electric resistance heaters.

Any of the illustrative steps of flow diagrams 3400-3500 may be combined with other steps, omitted, rearranged, or otherwise altered in accordance with the present disclosure.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A piston and cylinder assembly having a fluid bearing, the piston and cylinder assembly comprising:
  a cylinder comprising a bore;
  a piston assembly capable of translating axially within the bore, wherein the piston assembly comprises a piston face configured to contact a combustion section of the cylinder; and
  a bearing element affixed to the piston assembly, the bearing element forming at least a portion of a clearance gap between the piston assembly and the cylinder, wherein the bearing element is configured to provide a flow of a bearing fluid into the clearance gap, wherein the bearing fluid is comprised of a gaseous fluid, and wherein the bearing element comprises a feature that aids in centering the piston assembly about an axis of the bore using flow of a blow-by gas.

2. The piston and cylinder assembly of claim 1, wherein the piston assembly further comprises a feed passage configured to receive the bearing fluid from a fluid source, and wherein the feed passage is configured to provide the bearing fluid to the bearing element.

3. The piston and cylinder assembly of claim 2, wherein the bearing element comprises a porous annular element that allows the bearing fluid to flow radially outward through pores from the feed passage to the clearance gap.

4. The piston and cylinder assembly of claim 2, wherein the bearing element includes one or more radial holes, wherein the one or more radial holes allow the bearing fluid to flow radially outward from the feed passage to the clearance gap.

5. The piston and cylinder assembly of claim 1, wherein the bearing element comprises one of a graphite element, a metal element with machined features, a sintered metal element, and a porous ceramic element, and a nonporous ceramic element.

6. The piston and cylinder assembly of claim 1, wherein the bearing fluid comprises air.

7. The piston and cylinder assembly of claim 1, wherein the feature is selected from the group consisting of one or more slotted pockets, a step, a tapered portion, and any combination thereof.

8. The assembly of claim 1, wherein the feature comprises a labyrinth seal.

9. A piston and cylinder assembly having a fluid bearing, the piston and cylinder assembly comprising:
a cylinder comprising a bore, and a feed passage;
a piston assembly capable of translating axially within the bore, wherein the piston assembly comprises a piston face configured to contact a combustion section of the cylinder; and
a bearing element forming at least a portion of a clearance gap between the piston assembly and the cylinder, wherein the bearing element is affixed to the cylinder and is configured to provide a flow of a bearing fluid into the clearance gap, wherein the feed passage is configured to receive a bearing fluid from a fluid source and to provide the bearing fluid to the bearing element, and wherein the bearing element comprises a porous annular element that allows the bearing fluid to flow radially inward through pores from the feed passage to the clearance gap.

10. The piston and cylinder assembly of claim 9, wherein the bearing element comprises one of a graphite element, a metal element with machined features, a sintered metal element, and a porous ceramic element, and a nonporous ceramic element.

11. The piston and cylinder assembly of claim 9, wherein the bearing fluid comprises air.

12. The piston and cylinder assembly of claim 9, wherein the bearing element comprises a feature that provides self-centering using the flow of a blow-by gas, the feature selected from the group consisting of one or more slotted pockets, a step, a tapered portion, and any combination thereof.

13. A piston assembly comprising:
a piston face configured to contact a combustion section of a cylinder; and
a bearing element configured to provide an outward flow of a bearing fluid to a surface of the piston assembly, wherein the bearing fluid is comprised of a gaseous fluid, and wherein the bearing element comprises a feature that aids in centering the piston assembly about an axis of the bore using flow of a blow-by gas.

14. The piston assembly of claim 13, wherein the piston assembly further comprises a feed passage, wherein the feed passage is configured to receive the bearing fluid from a fluid source, and wherein the feed passage is configured to provide the bearing fluid to the bearing element.

15. The piston assembly of claim 14, wherein the bearing element comprises a porous annular element that allows the bearing fluid to flow radially outward through pores from the feed passage to the surface of the piston assembly.

16. The piston assembly of claim 14, wherein the bearing element includes one or more radial holes, wherein the one or more radial holes allow the bearing fluid to flow radially outward from the feed passage to the surface of the piston assembly.

17. The piston assembly of claim 13, wherein the feature is selected from the group consisting of one or more slotted pockets, a step, a tapered portion, and any combination thereof.

18. The piston assembly of claim 13, wherein the bearing element is a first bearing element, the piston assembly further comprising a second bearing element configured to provide an outward flow of a bearing fluid to a surface of the piston assembly.

19. The assembly of claim 13, wherein the feature comprises a labyrinth seal.

20. A cylinder of a piston engine, the cylinder comprising:
a bore capable of housing a movable piston, wherein in the bore comprises a combustion section;
a bearing element configured to provide a flow of a bearing fluid to the bore; and
a feed passage configured to receive the bearing fluid from a fluid source and to provide the bearing fluid to the bearing element, and wherein the bearing element comprises a porous annular element that allows the bearing fluid to flow radially inward through pores from the feed passage to the bore.

21. The cylinder of claim 20, wherein the bearing element comprises one or more radial holes, wherein the one or more radial holes allow the bearing fluid to flow radially inward from the feed passage to the bore.

* * * * *